US011623177B2

(12) United States Patent
Stuckenberg

(10) Patent No.: US 11,623,177 B2
(45) Date of Patent: Apr. 11, 2023

(54) ATMOSPHERIC WATER GENERATION SYSTEMS AND METHODS

(71) Applicant: Genesis Systems LLC, Kansas City, MO (US)

(72) Inventor: David J. Stuckenberg, Kansas City, MO (US)

(73) Assignee: Genesis Systems LLC, Tampa, FL (US)

( * ) Notice: Subject to any disclaimer, the term of this patent is extended or adjusted under 35 U.S.C. 154(b) by 0 days.

(21) Appl. No.: 17/301,680

(22) Filed: Apr. 12, 2021

(65) Prior Publication Data

US 2021/0229028 A1     Jul. 29, 2021

Related U.S. Application Data

(63) Continuation of application No. 16/782,808, filed on Feb. 5, 2020, now Pat. No. 11,000,799, which is a
(Continued)

(51) Int. Cl.
*B01D 53/18*     (2006.01)
*A01G 9/14*     (2006.01)
(Continued)

(52) U.S. Cl.
CPC ............ *B01D 53/18* (2013.01); *A01G 9/14* (2013.01); *A01G 9/24* (2013.01); *A01G 9/247* (2013.01);
(Continued)

(58) Field of Classification Search
CPC ................................. A01G 9/14; A01G 9/247
See application file for complete search history.

(56) References Cited

U.S. PATENT DOCUMENTS

| 4,134,269 A | 1/1979 | Arzet |
|---|---|---|
| 4,315,599 A | 2/1982 | Biancardi |

(Continued)

FOREIGN PATENT DOCUMENTS

| CN | 1223325 A | 7/1999 |
|---|---|---|
| CN | 203675747 U * | 7/2014 |

(Continued)

OTHER PUBLICATIONS

"Ink used to print paper-thin solar panels. University of Newcastle", *YouTube*, <https://www.youtube.com/watch?v=KhpCXTp736Y&feature=youtu.be>, May 23, 2017.
(Continued)

*Primary Examiner* — Robert A Hopkins
(74) *Attorney, Agent, or Firm* — Alston & Bird LLP

(57) ABSTRACT

An atmospheric water generation system comprises water vapor consolidation systems configured to increase the relative humidity of a controlled air stream prior to condensing water from the controlled air stream. The water vapor consolidation system comprises a fluid-desiccant flow system configured to decrease the temperature of the desiccant to encourage water vapor to be absorbed by the desiccant from an atmospheric air flow. The desiccant flow is then heated to encourage water vapor evaporation from the desiccant flow into a controlled air stream that circulates within the system. The humidity of the controlled air stream is thereby increased above the relative humidity of the atmospheric air to facilitate condensation of the water vapor into usable liquid water.

18 Claims, 10 Drawing Sheets

Related U.S. Application Data continuation of application No. 15/850,870, filed on Dec. 21, 2017, now Pat. No. 10,583,389.

(60) Provisional application No. 62/459,478, filed on Feb. 15, 2017, provisional application No. 62/459,462, filed on Feb. 15, 2017, provisional application No. 62/437,471, filed on Dec. 21, 2016.

(51) Int. Cl.
| | |
|---|---|
| *B01D 5/00* | (2006.01) |
| *B01D 53/26* | (2006.01) |
| *B01D 53/00* | (2006.01) |
| *E03B 3/28* | (2006.01) |
| *F25D 17/06* | (2006.01) |
| *F24F 3/14* | (2006.01) |
| *B01F 23/20* | (2022.01) |
| *B01F 23/21* | (2022.01) |
| *A01G 9/24* | (2006.01) |

(52) U.S. Cl.
CPC ............ *B01D 5/0003* (2013.01); *B01D 5/009* (2013.01); *B01D 53/002* (2013.01); *B01D 53/263* (2013.01); *B01F 23/20* (2022.01); *B01F 23/214* (2022.01); *E03B 3/28* (2013.01); *F24F 3/1417* (2013.01); *F25D 17/06* (2013.01); *B01D 5/0051* (2013.01); *B01D 5/0081* (2013.01); *B01D 2257/80* (2013.01); *Y02A 20/00* (2018.01)

(56) References Cited

U.S. PATENT DOCUMENTS

| | | |
|---|---|---|
| 5,601,236 A | 2/1997 | Wold |
| 5,634,342 A | 6/1997 | Peeters et al. |
| 5,857,344 A | 1/1999 | Rosenthal |
| 6,499,309 B1 | 12/2002 | Yeh |
| 6,574,979 B2 | 6/2003 | Faqih |
| 6,581,849 B2 | 6/2003 | Zhang |
| 6,709,198 B2 | 3/2004 | Wachtel |
| 7,293,420 B2 | 11/2007 | Max |
| 7,337,615 B2 | 3/2008 | Reidy |
| 7,895,847 B2 | 3/2011 | Larsen |
| 7,942,011 B2 | 5/2011 | Forkosh |
| 8,028,527 B2 | 10/2011 | Vidmar |
| 8,321,061 B2 | 11/2012 | Anderson |
| 8,820,107 B2 | 9/2014 | Parent |
| 10,260,761 B2 | 4/2019 | Martin |
| 10,583,389 B2 | 3/2020 | Stuckenberg |
| 11,000,799 B2 | 4/2021 | Stuckenberg |
| 2004/0079228 A1 | 4/2004 | Wijmans et al. |
| 2007/0028769 A1 | 2/2007 | Eplee et al. |
| 2007/0079624 A1 | 4/2007 | Max |
| 2009/0183631 A1 | 7/2009 | Hall et al. |
| 2012/0048117 A1 | 3/2012 | Katzir et al. |
| 2013/0340458 A1 | 12/2013 | Shaw et al. |
| 2014/0352536 A1 | 12/2014 | Dahlback et al. |
| 2015/0265962 A1 | 9/2015 | Dahlback et al. |
| 2016/0211796 A1 | 7/2016 | Hammad et al. |
| 2016/0336467 A1 | 11/2016 | Janet |
| 2019/0153704 A1 | 5/2019 | Gido et al. |
| 2022/0195706 A1 | 6/2022 | Stuckenberg et al. |
| 2022/0288505 A1 | 9/2022 | Stuckenberg et al. |

FOREIGN PATENT DOCUMENTS

| | | | |
|---|---|---|---|
| CN | 104775476 A | | 7/2015 |
| DE | 19632272 A1 | | 2/1998 |
| DE | 10154351 A1 | | 5/2003 |
| EP | 2631549 A1 | | 8/2013 |
| EP | 2643530 A1 | | 10/2013 |
| EP | 3481535 A1 | | 5/2019 |
| IL | 246467 | | 11/2016 |
| WO | WO 2006/026494 A1 | | 3/2006 |
| WO | WO 2006/129200 A2 | | 12/2006 |
| WO | WO 2008/018071 A2 | | 2/2008 |
| WO | WO 2011/062554 A1 | | 5/2011 |
| WO | WO 2011/150081 A2 | | 12/2011 |
| WO | WO 2012/073794 A1 | | 6/2012 |
| WO | WO-2012162545 A2 * | 11/2012 | ........... B01D 5/0006 |
| WO | WO 2013/002612 A2 | | 1/2013 |
| WO | WO 2015/162599 A2 | | 10/2015 |
| WO | WO 2016/081863 A1 | | 5/2016 |
| WO | WO 2016/187709 A1 | | 12/2016 |
| WO | WO 2018/002918 A1 | | 1/2018 |

OTHER PUBLICATIONS

"The solar cell that is transparent like glass. Keynote Prof. Richard Lunt at BMW Welcomes.", YouTube, <https://www.youtube.com/watch?v=5Vx59VLc98E&feature=youtu.be>, Nov. 26, 2015.

Belleza, Irish E., "Burj Khalifa: Towering challenge for builders", Gulf News, Jan. 4, 2010, retrieved from <https://gulfnews.com/business/property/burj-khalifa-towering-challenge-for-builders-1.561802> on Oct. 28, 2016.

Eole Wafer, "Our Products: Range of Water Generators", Jan. 7, 2011 to Sep. 17, 2017, Internet Archive <https://web.archive.org/web/*/http://www.eolewater.com/gb/our-products/range.html>, 6 pages, retrieved Mar. 22, 2018.

International Searching Authority, International Search Report and Written Opinion for International Application No. PCT/US2017/067915, dated Apr. 12, 2018, 15 pages, European Patent Office, Netherlands.

Snowden, Scott, "Solar Power Stations In Space Could Supply The World With Limitless Energy", Mar. 12, 2019, retrieved from https://www.forbes.com/sites/scottsnowden/2019/03/12/solar-power-stations-in-space-could-supply-the-world-with-limitless-energy/ on Apr. 15, 2020, 5 pages.

United States Patent and Trademark Office, Office Action for U.S. Appl. No. 15/850,870, filed Jul. 30, 2019, 12 pages, U.S.

U.S. Patent and Trademark Office, Office Action received for U.S. Appl. No. 16/782,808, dated Nov. 2, 2020, 16 pages.

Wikipedia Contributors, "Air Well (Condenser)", Wikipedia, The Free Encyclopedia, Wikimedia Foundation, Inc., last modified Oct. 17, 2016, retrieved from <https://en.wikipedia.org/wiki/Air_well_(condenser)> on Oct. 28, 2016.

Wood, Daniel, "Space-Based Solar Power", U.S. Department of Energy, Mar. 6, 2014, retrieved from https://www.energy.gov/articles/space-based-solar-power on Apr. 15, 2020, 6 pages, U.S.

www.solarclothsystem.com, Jan. 17, 2017 to May 17, 2017, Internet Achieve, retrieved from https://web.archive.org/web/20170517094053/https://www.solarclothsystem.com/technology on Apr. 15, 2020, 4 pages.

U.S. Appl. No. 16/782,808, filed Feb. 5, 2020, U.S. Pat. No. 11,222,799, Patented.

U.S. Appl. No. 15/850,870, filed Dec. 21, 2017, U.S. Pat. No. 10,583,389, Pateted.

International Searching Authority, International Search Report and Written Opinion received for International Application No. PCT/US2022/019491, dated Jul. 11, 2022, 12 pages, European Patent Office, Netherlands.

IP Australia, Examination Report received for Application No. 2021209303, dated Sep. 9, 2022, 6 pages, Australia.

\* cited by examiner

ATMOSPHERIC WATER GENERATION SYSTEMS AND METHODS

CROSS-REFERENCE TO RELATED APPLICATIONS

This patent application is a continuation of U.S. patent application Ser. No. 16/782,808, filed Feb. 5, 2020, which is a continuation of U.S. patent application Ser. No. 15/850,870, filed Dec. 21, 2017, which claims priority from Provisional Application Ser. No. 62/437,471, filed Dec. 21, 2016; Provisional Application Ser. No. 62/459,462, filed Feb. 15, 2017; and Provisional Application Ser. No. 62/459,478, filed Feb. 15, 2017, all of which are incorporated herein by reference in their entirety.

BACKGROUND

The amount of freshwater available for human consumption, plant irrigation, livestock and herd sustenance, commercial and/or industrial usage, and other purposes has generally been overtaken by the amount of freshwater needed for such purposes. Particularly in arid climates characterized by minimal annual rainfall and without access to other freshwater sources, maintaining an adequate amount of water for human and/or animal consumption and usage has become increasingly expensive in recent years. Processes such as desalination, water filtration and/or purification, groundwater (e.g., aquifer) exploitation, and other processes are often used in combination to supply freshwater to various geographical regions, depending on the relative availability and expense of each water sourcing process.

Water shortages in certain geographical regions are also at least partially responsible for food shortages in certain areas of the globe as well. Where water is not readily available for crop irrigation and for hydrating livestock, basic nutritional foods may be difficult to cultivate, and may be difficult or expensive to procure in an open market.

Accordingly, a need generally exists for processes that expand the availability of freshwater, particularly in arid geographical areas and/or areas with no access to standing water or sub-surface water or in areas where such have become contaminated

BRIEF SUMMARY

Various embodiments provide Atmospheric Water Generation (AWG) processes and mechanisms for condensing large quantities of liquid water from air. Certain embodiments may be configured for generating usable quantities of water even in low humidity, arid geographical regions, thereby providing water usable for crop irrigation, livestock and/or human consumption, commercial and/or industrial processes, and/or the like.

Certain embodiments are configured to compress source air (e.g., air retrieved from a surrounding environment) and/or to increase a humidity level of at least a portion of the source air to increase the efficiency of the AWG condensation processes, specifically to maximize the amount of water extracted per unit volume of source air. The extracted water may be provided to an integrated greenhouse configured for growing crops, and the system may be paired with an integrated carbon dioxide recovery/filtration system that may be utilized to extract carbon dioxide from the source air, from an integrated power generation system (e.g., a hydrocarbon combustion-based power generation system) and to optimize the carbon dioxide content of the air within the greenhouse. Moreover, power requirements of the AWG system may be met by one or more renewable energy sources that may be utilized based on availability and/or based on the type of energy-consuming process needed. For example, solar and/or photovoltaic power generation (e.g., thermal energy and/or electrical energy) may be utilized particularly for heating processes, and geothermal or other processes may be utilized for cooling needs of the AWG system.

Various embodiments are directed to an atmospheric water generation system comprising: a water vapor consolidation system configured to consolidate water vapor into a controlled air stream and a condenser configured to condense water vapor into liquid water from a closed air stream. In certain embodiments, the water vapor consolidation system comprises: an atmospheric air intake mechanism defining an atmospheric air stream between an air intake and an air exhaust; a controlled air circulation mechanism defining an air circulation loop, wherein the air circulation loop is separated from the atmospheric air stream; and a fluid desiccant circulation loop defining a closed desiccant circulation loop for a fluid desiccant, wherein the closed desiccant circulation loop intersects the atmospheric air stream and the closed air circulation loop to extract water vapor from the atmospheric air stream and to evaporate water vapor into the air circulation loop.

In various embodiments, the fluid desiccant circulation loop comprises at least one desiccant column configured to contact the fluid desiccant with at least one of the atmospheric air stream and the air circulation loop. Moreover, the desiccant column may be configurable between: an absorption configuration in which the atmospheric air stream flows through the desiccant column to contact the liquid desiccant such that the liquid desiccant absorbs water vapor from the atmospheric air stream; and an evaporation configuration in which the air circulation loop flows through the desiccant column to contact the liquid desiccant such that water evaporates from the liquid desiccant into the air circulation loop. Moreover, the fluid desiccant circulation loop may additionally comprise a liquid desiccant cooling mechanism configured to cool the liquid desiccant flowing through the desiccant column and a liquid desiccant heating mechanism configured to heat the liquid desiccant flowing through the desiccant column; and wherein the fluid desiccant solution may flow through the liquid desiccant cooling mechanism and the fluid desiccant heating mechanism is deactivated while the desiccant column is in the absorption configuration; and the fluid desiccant solution may flow through the liquid desiccant heating mechanism and the fluid desiccant cooling mechanism is deactivated while the desiccant column is in the evaporation configuration. The liquid desiccant cooling mechanism may comprise a geothermal cooling mechanism. For example, the liquid desiccant solution may flow directly through geothermal cooling tubes, or the liquid desiccant solution may flow through a heat exchanger cooled by a cooling fluid that flows through geothermal cooling tubes. In certain embodiments, the liquid desiccant heating mechanism comprises a solar heating mechanism. For example, the liquid desiccant solution may flow directly through solar-heated tubes, or the liquid desiccant solution may flow through a heat exchanger heated by a heating fluid that flows through solar heated tubes. Moreover, in certain embodiments the atmospheric water generation system further comprises a desiccant fluid swing tank configured to retain at least a portion of the liquid desiccant while the liquid desiccant absorbs water vapor.

In various embodiments, the fluid desiccant circulation loop comprises an absorption desiccant column and an evaporation desiccant column, wherein: the absorption desiccant column is configured to contact the fluid desiccant with the atmospheric air stream; and the evaporation desiccant column is configured to contact the fluid desiccant with the air circulation loop. In certain embodiments, the fluid desiccant circulation loop additionally comprises: a liquid desiccant cooling mechanism located between the evaporation desiccant column and the absorption desiccant column and upstream of the absorption desiccant column, wherein the liquid desiccant cooling mechanism is configured to lower the temperature of the liquid desiccant flowing through the absorption desiccant column; and a liquid desiccant heating mechanism located between the absorption column and the evaporation column, wherein the liquid desiccant heating mechanism is configured to heat the temperature of the liquid desiccant flowing through the evaporation desiccant column. The liquid desiccant cooling mechanism may comprise a geothermal cooling mechanism located upstream of the absorption column. For example, the liquid desiccant solution may flow directly through geothermal cooling tubes, or the liquid desiccant solution may flow through a heat exchanger cooled by a cooling fluid that flows through geothermal cooling tubes. In certain embodiments, the liquid desiccant heating mechanism comprises a solar heating mechanism located upstream of the evaporation column. For example, the liquid desiccant solution may flow directly through solar-heated tubes, or the liquid desiccant solution may flow through a heat exchanger heated by a heating fluid that flows through solar heated tubes.

Moreover, in various embodiments the atmospheric water generation system further comprises a membrane desorption system, wherein the membrane desorption system comprises a porous membrane separating the fluid desiccant circulation loop on a first side of the porous membrane from a liquid water circulation loop on a second side of the porous membrane, and wherein the membrane desorption system is configured to migrate water from the fluid desiccant circulation loop through the membrane to the liquid water circulation loop. The membrane desorption system may be located between the absorption column and the evaporation column such that the liquid desiccant circulation loop moves from the absorption column, through the membrane desorption system, and into the evaporation column.

In certain embodiments, the atmospheric intake mechanism comprises an air preconditioning system configured to cool the atmospheric air before contacting the fluid desiccant. Moreover, the fluid desiccant may comprise at least one of aqueous lithium chloride or aqueous calcium chloride (or other ionic solutions capable of absorbing water).

In certain embodiments, the atmospheric water generation system may comprise a plurality of separate desiccant solution loops, each of the separate desiccant solution loops are configured to contact the atmospheric air stream and the closed air stream. In certain embodiments, the plurality of separate desiccant solution loops may comprise a first desiccant solution loop comprising a first desiccant solution at a first concentration, and a second desiccant solution loop comprising a second desiccant solution at a second concentration. In certain embodiments, the first desiccant solution may comprise lithium chloride and the second desiccant solution may comprise calcium chloride.

Various embodiments are directed to a method for condensing water vapor from atmospheric air into liquid water. In certain embodiments, the method comprises: flowing atmospheric air into contact with a rich liquid desiccant solution such that the liquid desiccant solution absorbs water vapor from the atmospheric air to dilute the liquid desiccant solution; flowing a closed air stream into contact with the diluted liquid desiccant solution such that water vapor evaporates from the diluted liquid desiccant solution into the closed air stream to create the rich liquid desiccant solution and to increase the humidity of the closed air stream; after increasing the humidity of the closed air stream, flowing the closed air stream through a condenser to condense water vapor within the closed air stream into liquid water; and collecting the liquid water condensed from the closed air stream.

In certain embodiments, the method further comprises steps for before contacting the atmospheric air with the rich desiccant solution, cooling at least one of the atmospheric air and the rich desiccant solution. Moreover, the method may further comprise steps for: before contacting the closed air stream with the diluted liquid desiccant solution, heating the diluted liquid desiccant solution. In certain embodiments, flowing the atmospheric air into contact with the rich liquid desiccant solution comprises flowing the atmospheric air and the rich liquid desiccant solution into an absorption column; and flowing the closed air stream into contact with the diluted liquid desiccant solution comprises flowing the closed air stream and the diluted liquid desiccant solution into an evaporation column; and wherein the diluted liquid desiccant solution flows along a desiccant loop between the absorption column and the evaporation column. Moreover, the desiccant loop may comprise a plurality of flow valves configured to selectably change the flow of the liquid desiccant solution, and wherein: flowing the atmospheric air and the rich liquid desiccant solution into an absorption column may comprise flowing fresh atmospheric air through the absorption column and closing at least one valve to prevent liquid desiccant solution from flowing through the evaporation column; and flowing the closed air stream into contact with the diluted liquid desiccant solution may comprise flowing the closed air stream through the evaporation column and closing at least one valve to prevent liquid desiccant solution from flowing through the absorption column.

Certain embodiments are directed to an agricultural system configured for growing crops within a growth habitat. The agriculture system may comprise an enclosed growth habitat comprising a plant growth medium configured for supporting a plurality of crops; an atmospheric water generation system comprising: an atmospheric air intake system configured to draw atmospheric air comprising water vapor into the atmospheric water generation system; an air preconditioning system configured to cool the atmospheric air toward an air dew point; a condenser configured to condense water vapor within the cooled air into liquid water; and a water storage reservoir configured to store the liquid water generated within the condenser; a water distribution system configured to distribute the liquid water from the water storage reservoir within the enclosed growth habitat.

In certain embodiments, the air preconditioning system comprises a geothermal cooling system configured to cool the atmospheric air. Moreover, the geothermal cooling system may comprise a heat exchanger within a flow path of the atmospheric air, wherein the heat exchanger is configured to circulate a cooling fluid through the heat exchanger and through geothermal cooling tubes to cool the atmospheric air passing through the heat exchanger. The air preconditioning system may additionally comprise a vortex air cooler configured to cool the atmospheric air.

In certain embodiments, the enclosed growth habitat comprises a frame supporting a transparent covering material that defines the interior of the growth habitat, and wherein the covering material comprises one or more photovoltaic elements configured to generate electricity when exposed to sunlight. The covering material may additionally comprise one or more Light Emitting Diodes (LEDs) in electrical communication with the one or more photovoltaic elements. The one or more LEDs may be embodied as plant growth lights.

In certain embodiments, the agricultural system further comprises a carbon dioxide capture system within the atmospheric intake system, wherein the carbon dioxide capture system is configured to lower the carbon dioxide concentration within the atmospheric air. The carbon dioxide capture system may be configured to direct at least a portion of the captured carbon dioxide into the growth habitat.

Certain embodiments are directed to a surface covering for an enclosed growth habitat. The surface covering may comprise: a first flexible protecting layer, wherein the first flexible protecting layer is one of transparent or translucent; a second flexible protecting layer, wherein the second flexible protecting layer is one of transparent or translucent; a plurality of photovoltaic elements forming a photovoltaic array, wherein the photovoltaic array is positioned between the first flexible protecting layer and the second flexible protecting layer and is configured to collect sunlight through the first flexible protecting layer; and a plurality of light emitting diode (LED) elements forming an LED array, wherein the LED array is positioned between the first flexible protecting layer and the second flexible protecting layer and is configured to emit light through the second flexible protecting layer; and wherein the plurality of LED elements receive electrical power from the plurality of photovoltaic elements.

In various embodiments, the surface covering additionally comprises one or more attachment members configured to secure the surface covering relative to a support frame of a growth habitat.

Moreover, the LED array may comprise a plurality of LEDs connected within a circuit and arranged in parallel. In certain embodiments, the photovoltaic array comprises a plurality of photovoltaic elements connected within a circuit and arranged in parallel. In certain embodiments, the LED array and/or the photovoltaic array may be flexible. Moreover, the surface covering may additionally comprise one or more electrical connectors extending beyond the surface covering, wherein the one or more electrical connectors are configured to be connected relative to additional surface coverings. In various embodiments, the first flexible protecting layer and the second flexible protecting layer are configured to allow sunlight to pass through the surface covering. The first flexible protecting layer may be secured relative to the photovoltaic element array via an adhesive.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
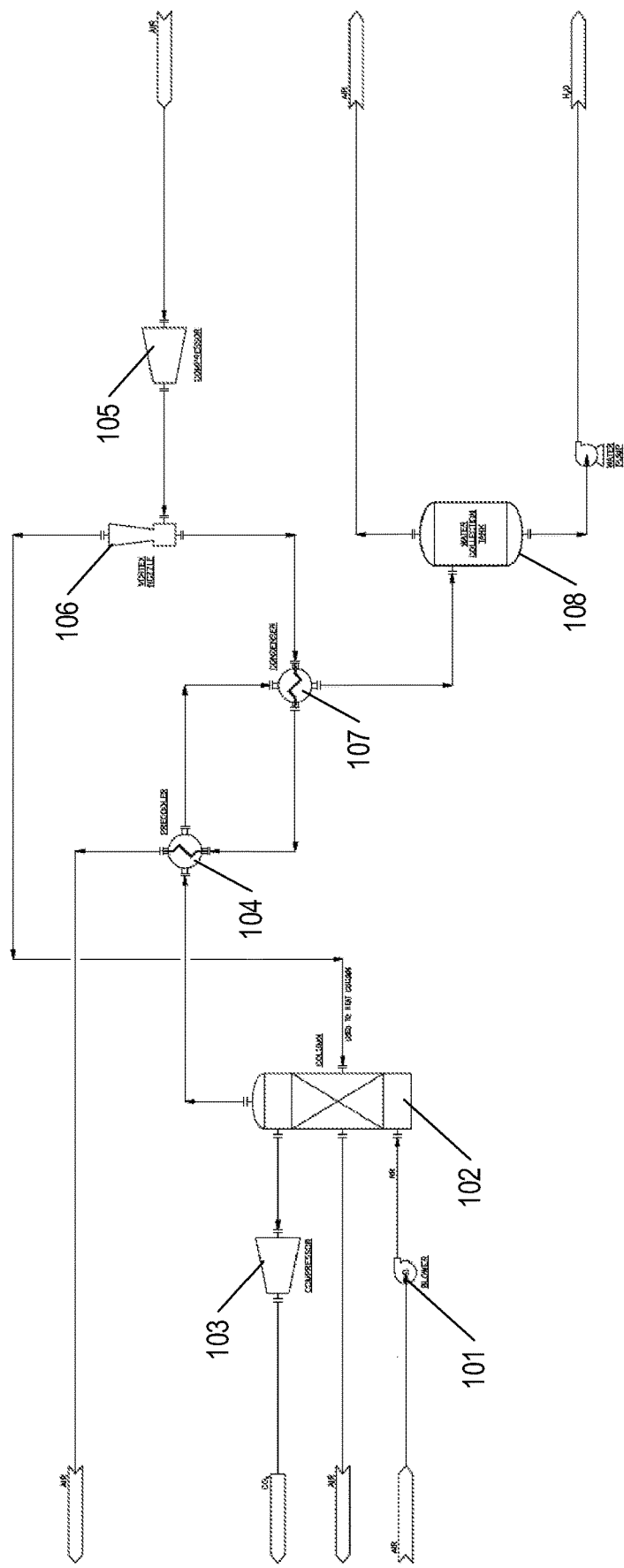
FIG. 1 shows a schematic diagram an air preconditioning system and condenser according to one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

The AWG system utilizes a condensation coil and/or plate system for extracting water from air. During the water extraction process of the integrated AWG process, humid air (having greater than 0% humidity) is passed over/around/through cooled condensation surfaces (e.g., coils, plates, and/or the like) to lower the temperature of the humid air below the dew point, thereby causing water vapor within the humid air to condense on the condensation surfaces. The condensed water is then directed into a collection chamber (e.g., tank, basin, and/or the like) for storage and use.

In certain embodiments, the AWG system additionally comprises one or more air compression mechanisms, air cooling mechanisms, or air humidity increasing mechanisms to optimize the amount of water extracted from air (per unit of source air intake into the AWG system).

In certain embodiments, the AWG system may be integrated with one or more carbon dioxide filtration/capture modules, one or more greenhouse modules, one or more power generation modules, and/or the like. For example, the source air intake into the AWG system may be routed through a carbon dioxide capture system prior to exhausting the dry, dehumidified air to the surrounding environment. The captured carbon dioxide may be stored for later processing in a tank, or it may be released (e.g., in a monitored quantity) into one or more greenhouse modules to increase the carbon dioxide concentration within the greenhouse to thereby increase crop growth efficiency.

Moreover, a power generation module, which may comprise one or more renewable energy power generation systems, such as solar/photovoltaic, geothermal, and/or the like, or hydrocarbon-fuel based power generation systems, may be integrated with the AWG system to provide needed electrical and/or thermal energy inputs for the AWG processes. In the event that such power generation modules generate carbon dioxide or other exhaust gases, the exhaust gases of the power generation modules may be routed through the carbon dioxide capture modules to decrease the carbon dioxide production of the integrated system.

Atmospheric Water Resources

The atmosphere contains approximately 3100 cubic miles ($mi^3$) or 12,900 cubic kilometers ($km^3$) of water. This quantity is roughly equivalent to all of the water held by the Great Lakes by volume. Water vapor as a natural resource is constantly replenished by the natural closed loop hydrologic cycle, thereby providing a nearly limitless supply of water that may be extracted from air without adverse environmental impact.

Atmospheric Water Generation

The process of AWG comprises systems and methods for extracting water vapor from atmospheric source air by condensing the water vapor and capturing the condensed, liquid water. Certain embodiments may be combined with carbon dioxide capture systems as discussed herein. Certain embodiments comprise steps for preconditioning and/or compressing raw source air (e.g., air at atmospheric conditions) to ease the water extraction process, and/or condensing the water vapor trapped within the raw source air (e.g., by increasing the humidity of at least a portion of the raw source air) to maximize the amount of water vapor that may be extracted from a given unit volume of source air. As discussed herein, processed source air is compressed, consolidated, and/or otherwise manipulated through one or more processes, for example, to ease the water extraction process.

Ultimately, various embodiments of the AWG process comprise condensation mechanisms through which source air (raw source air and/or processed source air, as discussed herein) may be directed over one or more condensation surfaces each having a surface temperature below the dew point of the source air. As the source air flows over and/or around the condensation surfaces, the temperature of the source air adjacent the condensation surfaces drops (e.g., through convective heat transfer), and water vapor within the source air condenses on the condensation surfaces, and the condensed, liquid water flows into a storage vessel (e.g., a capture tank) and/or to one or more related modules (e.g., a greenhouse module) for immediate use.

Air Preconditioning

As noted above, raw source air may be preconditioned to ease the water extraction process utilized to ultimately condense water vapor into usable liquid water. In certain embodiments, the preconditioning process may comprise steps for compressing the air to increase the vapor pressure of the air (thereby biasing a greater volume of water to the liquid state rather than the vapor state) and/or to decrease the temperature of the source air to a temperature nearer to the dew point. In certain embodiments, an air preconditioning system described herein may be utilized before and/or after a humidity increasing system, such as a desiccant-based humidity increasing system as described herein. Moreover, the air preconditioning system may be utilized before and/or after a carbon dioxide capture system as discussed herein.

As just one example, the air preconditioning process may comprise a series of compressors/pumps, venturi valves, vortex valves, manifolds, and/or the like collectively configured to decrease the temperature of the source air closer to the air dew point and/or to increase the pressure of the air prior to removing water vapor from the air (e.g., through condensation or absorption by a desiccant). For example, raw source air may be drawn into the air preconditioning system via a vacuum pressure formed at an inlet via a compressor 101 (e.g., a turbine/blower compressor having a plurality of stator or variable pitch turbine blades controllable via servo motors) and/or a centrifugal fan configured to increase the raw air pressure entering the air preconditioning system. In certain embodiments, the compressor 101 and/or centrifugal fan may be rotated via one or more electrical motors (which may receive electrical input power from one or more power systems in communication with the air preconditioning system) mechanically connected with the compressor 101 and/or centrifugal fan via a gear transmission, a belt drive, a chain drive, and/or the like.

In embodiments comprising a centrifugal fan, particulates, dust, and other heavy air contaminants are spun to the outermost edge of the centrifugal fan and are removed from the air stream and ejected from the air preconditioning system.

In the illustrated embodiment of FIG. 1, the filtered air may be directed into a carbon dioxide capture column 102, where it is passed over a fixed absorption bed configured to absorb carbon dioxide from the air, as discussed in greater detail herein. The carbon dioxide may be separated and directed away from the air stream via a compressor 103.

In certain embodiments, the filtered air (with a reduced carbon dioxide content) may then directed further through the air preconditioning system into a primary manifold, where the air is divided at a selected ratio by a variable plenum/valve. From the primary manifold, a first air stream continues along a bulk air stream, and a second air stream is directed to a vortex tube manifold as discussed herein.

The bulk air stream may proceed through one or more venturi valves each configured to decrease the pressure and temperature of the bulk air stream (the volume and quantity of air remains constant across each venturi valve while the pressure decreases, thereby causing the temperature of the air stream to decrease proportionally to the temperature) and/or through a precooler 104 (e.g., a heat exchanger with a cooling fluid passing therethough). After proceeding through the one or more venturi valves and/or the precooler 104, the bulk air stream may proceed to a temperature measurement portion, where the temperatures (e.g., dry bulb and wet bulb temperatures) of the bulk air stream are measured by one or more temperature measurement devices (e.g., thermometers) to determine the dew point of the bulk air stream. Outputs from the temperature measurement devices may be utilized by a controller to mix the bulk air stream with at least a portion of the vortex-chilled air stream to lower the temperature of the bulk air closer to the air dew point. For example, the controller may be in electronic communication with an electromechanical mixing valve that may be selectably opened or closed to vary the amount of vortex-chilled air that is introduced into the bulk air stream. Based on the determined dry-bulb and/or wet-bulb temperatures (as monitored by the controller), the controller may transmit a signal to a motor to move the electromechanical valve to a desired position to obtain a desired mixture of vortex-chilled air with the bulk air stream.

The vortex-chilled air begins as the second stream of air exiting the primary manifold. The second stream of air exits the primary manifold, and proceeds to a vortex tube manifold where it is pressurized (e.g., via a compressor 105) to a sufficient pressure to achieve a drop in temperature of the air travelling through one or more vortex tubes 106 of between approximately 70-150 degrees Fahrenheit. For example, the air may be pressurized to at least approximately 70-120 PSI prior to being directed into the one or more vortex tubes 106. Each vortex tube 106 comprises an entry port directing the stream of air tangentially into an internal spin chamber. As air enters the spin chamber, the air takes on an angular momentum, causing dense, warm air to migrate towards an exterior perimeter of the spin chamber and out of an exhaust valve. In certain embodiments, the warm air may be utilized to heat the carbon dioxide capture column 102 as shown in FIG. 1. The remaining, vortex-chilled air migrates toward the center of the spin chamber and out of a vortex outlet. As mentioned above, the vortex-chilled air may be mixed with the bulk air stream to lower the temperature of the bulk air stream closer to the dew point. As yet another alternative, the vortex chilled air may be utilized to chill the precooler 104 through which the bulk air passes.

In certain embodiments, the mixed and chilled bulk air stream is then directed into a condensation chamber 107, where the water vapor within the air is condensed into liquid water. As just one example, the bulk air stream may be directed over a series of condensation surfaces (e.g., chilled plates, screens, tubes, and/or the like configured to lower the localized temperature of the air at the condensation surfaces below the air dew point, thereby causing the water vapor to condense on the condensation surfaces. The condensed water may then be routed from the condensation surfaces into a retention chamber 108 for collection and later use. However, it should be understood that any of a variety of condensation mechanisms may be used. For example, as discussed herein, one or more desiccant-based condensation mechanisms may be utilized to more effectively remove water vapor from the bulk air stream. Moreover, in certain embodiments the air-preconditioning system may be omitted, and raw air may be filtered and/or directed immediately into a condensation chamber. Such embodiments may have a lower input power requirement, and therefore the amount of power required for water generation may be decreased.

It should also be understood that certain preconditioning system embodiments comprise one or more filters (e.g., fabric-based air filters, non-woven based air filters, and/or the like), one or more refrigerant systems (e.g., warm air is passed through a heat-exchanger to lower the temperature of the air closer to the dew point), and/or the like in place of or in addition to the vortex and venturi valve mechanisms discussed herein.

Desiccant-Based Air Humidity Increasing System

As mentioned above, certain embodiments comprise one or more subsystems configured to increase the humidity of a portion of the source air to increase the amount of water that may be extracted from the source air. Specifically, water vapor may be extracted from a first, large quantity of source air, and may be reintroduced into a second, smaller quantity of source air, thereby consolidating the water vapor of the source air and increasing the humidity of the second quantity of source air before the water vapor in the second quantity of source air is condensed into liquid water.

The desiccant-based air humidity increasing systems comprise at least one air scrubber comprising a column of aqueous desiccant. The desiccant may be selected from any of a variety of ionic solutions capable of absorbing water, such as lithium-chloride (LiCl), lithium-bromide (LiBr), Calcium Chloride (CaCl), triethylene glycol. and/or the like. In certain embodiments, the desiccant solution may comprise a mixture of a plurality of ionic solutions, such as a mixture of LiCl solution and CaCl solution, The desiccant may be dissolved in water to provide a highly concentrated desiccant solution that may be pumped (e.g., via liquid pumps) through the at least one desiccant column.

Moreover, the amount of water vapor that may be absorbed by the desiccant (and/or released by the desiccant into air) is dependent on the vapor pressure and temperature of a closed system including the aqueous desiccant and air adjacent the desiccant column. Accordingly, various embodiments are configured to absorb water from the air into the aqueous desiccant while the vapor pressure in the closed system is high and the temperature is low, and those same embodiments are configured to evaporate water from the desiccant into air while the vapor pressure is low and the temperature is high.

Single Stage Batch Vapor Consolidation

The single stage batch vapor consolidation system utilizes a single desiccant column that is configurable between an absorption phase and an evaporation phase. Because the functionality of the desiccant column between the absorption phase and the evaporation phase is dependent at least in part on the temperature of the closed system, the desiccant column may be switched between the absorption phase and the evaporation phase based on the ambient temperature surrounding the system. For example, the system may operate in the absorption phase during low temperature time periods (e.g., during a night time) and may operate in the evaporation phase during high temperature time periods (e.g., during a day time).

Figure 2A:
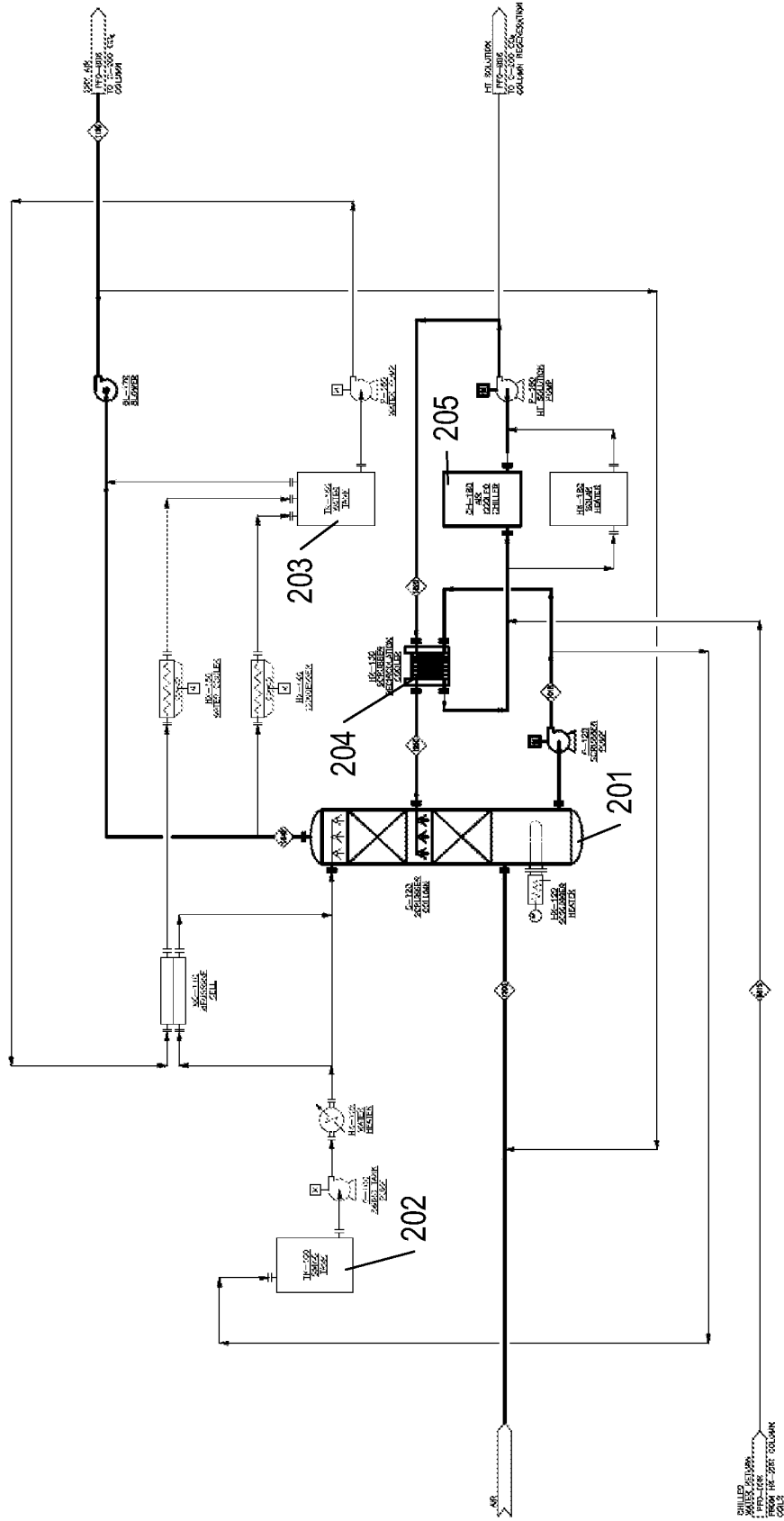
FIGS. 2A-2B show schematic diagrams of a batch vapor consolidation system inline with a vapor condensation system according to one embodiment.
Figure 2B:
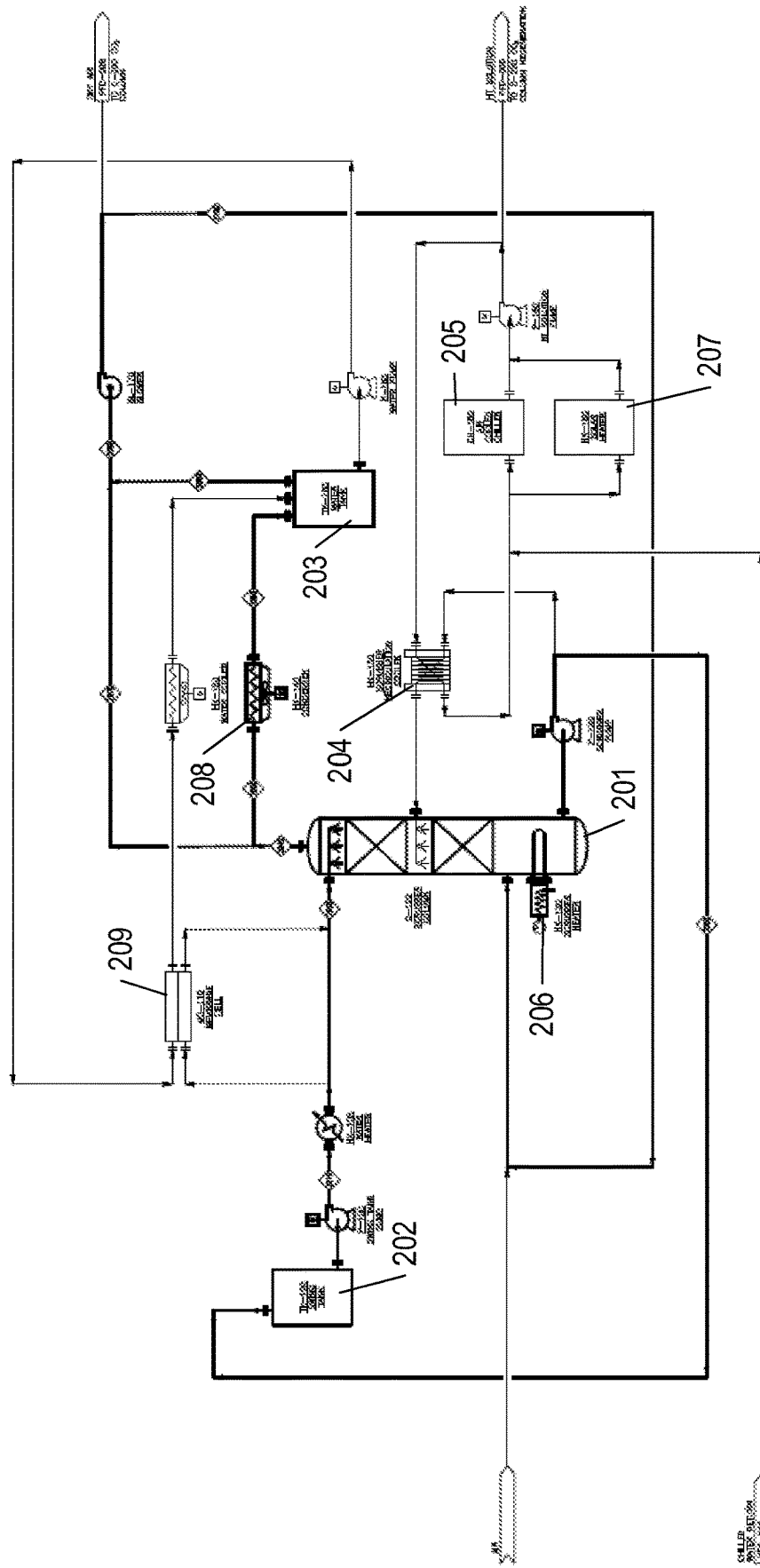

FIGS. 2A and 2B illustrate a single-stage batch vapor consolidation system according to various embodiments. Each figure highlights the fluid flow path during each of the absorption and evaporation phases, respectively. The single-stage batch vapor consolidation system comprises an air scrubber including an aqueous desiccant column 201, a desiccant swing tank 202 configured to hold excess desiccant solution, a water tank configured to hold retrieved water 203, and one or more liquid and/or air heat exchangers.

During low-temperature ambient periods (e.g., night-time hours between sunset and sunrise), the single-stage vapor consolidation system may operate in an absorption phase, during which water vapor from ambient air is absorbed into the aqueous desiccant solution passing through the desiccant column. Prior to beginning the absorption phase, the desiccant solution is highly concentrated, such that the desiccant solution is highly receptive to absorbing additional water. As the absorption phase proceeds, air having entrained water vapor is passed through the desiccant column 201 (e.g., with a turbulent flow) to contact the air with the desiccant solution. Water vapor within the air is absorbed by the desiccant solution, which causes the humidity of the air to drop (such that dry air exits the desiccant column), the volume of the desiccant solution to increase, and the concentration of the desiccant solution to decrease. Excess desiccant solution from the desiccant column 201 is stored within the swing tank 202, which has an available volume greater than the volume of the desiccant column 201.

In certain embodiments, the desiccant column 201 may be embodied as a membrane-separated desiccant column, having a desiccant flow path on a first side of a porous membrane, and an air flow path on an opposite, second side of the porous membrane. Separating the air flow path from the desiccant solution flow path may impede undesirable mass flow of the desiccant salt itself into the air flow path and ultimately out of the AWG system. Water may be absorbed by the desiccant solution from the air based on osmotic water flow through the membrane from the air to the desiccant solution. Water vapor may condense on the second side of the membrane, travel through the membrane pores through capillary action, and be absorbed by the high-salt content concentrated desiccant solution.

Based on the mass and heat transfer from the air to the desiccant solution, the temperature of the desiccant solution increases as water is absorbed. Accordingly, the desiccant solution is circulated through an absorption loop highlighted in FIG. 2B, including the desiccant column 201 and a cooling recirculation loop configured to maintain the temperature of the desiccant solution at the ambient temperature of the system or below. In certain embodiments, the desiccant solution may be circulated through the swing tank 202 as a part of the cooling recirculation loop.

Any of a variety of cooling mechanisms may be utilized in the cooling recirculation loop. For example, the cooling recirculation loop may comprise a dual-fluid heat exchanger 204 (e.g., a shell and tube heat exchanger; a counter-flow heat exchanger; and/or the like) in which the liquid desiccant solution flows through a first fluid flow path, and a cooling fluid (e.g., a refrigerant, a cooled air, and/or the like) may pass through a second fluid flow path, such that heat from the liquid desiccant may be passed to the cooling fluid. The cooling fluid may be maintained at a desired cooling temperature via a traditional refrigeration cycle, via geo-thermal cooling, and/or the like. As yet another example, the liquid desiccant may pass through a geo-thermal cooling loop 205 (e.g., by directing the liquid desiccant through a series of underground conductive tubes that enables heat to pass from the liquid desiccant to the ground), and/or the like.

The absorption phase of the single-stage vapor consolidation system may be stopped when the ambient temperature begins to rise (e.g., approximately sunrise) and/or when the desiccant solution becomes super saturated, such that the desiccant solution at least substantially stops absorbing additional water from air passing through the desiccant column 201. In certain embodiments, concentration of the desiccant solution may be monitored by a control system, and the control system may halt the absorption phase by stopping the various fluid pumps, air fans, and/or the like from moving various fluids through the system upon determining that a trigger event occurs. In certain embodiments, the trigger event may be identified as a threshold desiccant concentration within the desiccant solution (e.g., once the desiccant solution concentration drops below a threshold value, the controller may stop the absorption phase), a threshold rate of concentration change (e.g., the desiccant solution concentration decreases by less than a threshold amount over a set period of time), and/or the like. The trigger event may be based on other characteristics of the single-stage vapor consolidation system, such as the temperature of the desiccant solution (e.g., the temperature of the desiccant solution increasing beyond a threshold value), the temperature (dry bulb and/or wet bulb) of the source air (e.g., the temperature of the ambient air surrounding the system increases beyond a threshold value), the volume of the desiccant solution increases above a threshold value, and/or the like.

Once the absorption phase is stopped, the single-stage vapor consolidation system moves the desiccant solution out of the cooling recirculation loop and into the swing tank 202. In certain embodiments, at least a portion of the desiccant solution within the desiccant column 201 is pumped into the swing tank, such that a majority of the desiccant solution resides in the swing tank after the absorption phase is stopped. In certain embodiments, at least 85% of the desiccant solution is pumped into the swing tank 202 after the absorption phase is stopped.

The single-stage vapor consolidation system may be switched to an evaporation phase. In certain embodiments, the single-stage vapor consolidation system may be switched to the evaporation phase upon the detection of a trigger event by a controller. For example, once the ambient air temperature surrounding the single-stage vapor consolidation system increases above a threshold temperature, once the concentration of the desiccant solution decreases below a threshold concentration, and/or the like, the single-stage vapor consolidation system may switch into the evaporation phase. In various embodiments, the single-stage vapor consolidation system is configured to switch directly between the absorption phase and the evaporation phase. Accordingly, it should be understood that any of the trigger events noted above as being used to determine the end of the absorption phase may be used (e.g., simultaneously and/or consecutively) to begin the evaporation phase.

However, it should be understood that in certain embodiments the single-stage vapor consolidation system may be configured to enter a stand-by phase between the end of the absorption phase and the beginning of the evaporation phase. For example, the single-stage vapor consolidation system may be configured to enter the stand-by phase upon the detection of a first trigger event (e.g., the concentration of the desiccant solution decreases below a threshold level) and the single-stage vapor consolidation system may be configured to begin the evaporation phase (thus ending the stand-by phase) upon the occurrence of a second trigger event (e.g., the ambient temperature surrounding the single-stage vapor consolidation system increases above a threshold level).

During the evaporation phase, air within the single-stage vapor consolidation system is circulated in a closed loop as shown in FIG. 2B, such that water vapor evaporated from the liquid desiccant does not leave the single-stage vapor consolidation system.

As the air circulates through the closed loop of the single-stage vapor consolidation system, the low-concentration desiccant solution is pumped through a closed loop from the swing tank 202, past/through a heater 206, and through the desiccant column 201 of the scrubber. In certain embodiments, the swing tank 202 and/or the desiccant column 202 may comprise a heater 206 as shown in FIG. 2B, such that a separate heating mechanism is unnecessary. However, it should be understood that the heater mechanism may be embodied in any of a variety of forms that may be implemented as a part of the swing tank 202, a part of the desiccant column 201, or as a separate mechanism located within the closed loop of the desiccant flow. For example, the heater may comprise a resistance heater having a heating element positioned within the flow path of the liquid desiccant. As yet another example, the heater may comprise a dual-fluid heat exchanger, in which the liquid desiccant flows through a first fluid flow path and a heating fluid (e.g., a heated gas, a heated liquid, and/or the like) flows through a second flow path such that heat from the heating fluid is transferred (e.g., via conductive heat transfer) to the liquid desiccant. As a specific example, the heat exchanger may comprise a shell and tube heat exchange, a plate heat exchanger, or a counter-flow heat exchanger. In such embodiments, the heating fluid may be heated using any of a variety of heating mechanisms, such as a resistance heater having a heater element within the fluid flow of the heating fluid, a solar-heater in which the heating fluid flows through a series of solar-heated tubes that absorb radiant and/or convective ambient heat, and/or the like.

As yet another example, the desiccant solution may flow through a solar heater 207 comprising a series of solar-heated tubes that absorb radiant and/or convective ambient heat, and/or the like to heat the desiccant solution to a desired temperature.

The heating mechanism of the closed-loop desiccant flow path may be configured to heat the temperature of the liquid desiccant solution to lower the vapor pressure of the closed system of air and liquid within the desiccant column. In certain embodiments, the heating mechanism is configured to heat the desiccant solution to a steady-state temperature of at least about 65-95 degrees Celsius.

The evaporation phase of the single-stage batch vapor consolidation system may operate as a desalination system to remove water from the desiccant solution. As air and heated desiccant solution pass through the desiccant column 201, water from the desiccant solution evaporates into the air, thereby increasing the concentration of the desiccant solution while simultaneously increasing the humidity of the air. This mass transfer causes the temperature of the desiccant solution to decrease, and the heating mechanism is configured to maintain the desiccant solution at a desired elevated temperature.

As discussed in greater detail herein, the elevated-humidity air may be directed through a condensation chamber 208 as a part of the closed-loop air flow path to condense water from the air to lower the humidity of the air and to collect the water as a usable liquid within the water tank 203. This simultaneously enables the collection of usable water and maintains the humidity level of the air at a desired low level to maintain a low vapor pressure within the desiccant column to encourage water to evaporate from the desiccant solution.

In certain embodiments, the condensation chamber 208 may comprise a heat exchanger configured to lower the temperature of the increased-humidity air exiting the desiccant column 201 closer to the dew point of the air to increase the rate of condensation once the air enters the condensation chamber 208.

Various embodiments may additionally comprise a membrane desalination system 209 inline with the desiccant closed loop flow path. In the membrane desalination system 209, the desiccant flow path may flow past a first side of a membrane, such that the desiccant solution contacts the membrane as it travels along the desiccant flow path. The membrane may separate the desiccant solution flow path from a water flow path for water collected from the condensation process described herein. The water flow path may pass a second side of the membrane such that the water contacts the second side of membrane as it flows along the water flow path.

The membrane may comprise a porous membrane, such as non-woven membrane having a small pore size. As just one example, the membrane may comprise expanded polytetrafluoroethylene (ePTFE). As the desiccant solution and the water flow past opposite sides of the membrane, water molecules migrate from the high-salt content desiccant solution through the membrane (via capillary action), to the water flow.

The membrane desalination system 209 may be positioned between the swing tank 202 and the desiccant column 201, such that the desiccant solution first passes through the membrane system before entering the desiccant column 201. Accordingly, a first quantity of water may be removed from the desiccant solution at the membrane system before the desiccant solution enters the desiccant column for evaporation of additional water therefrom.

Moreover, as mentioned above, the single-stage batch vapor consolidation system may be a part of an AWG system comprising one or more air preconditioning systems and/or carbon dioxide capture systems. For example, the air preconditioning system may be located upstream of the single-stage batch vapor consolidation system, such that source air entering the AWG system first passes through the air preconditioning system prior to entering the single-stage batch vapor consolidation system.

In certain embodiments, the AWG system may comprise an air preconditioning system as discussed above between the single-stage batch vapor consolidation system and the condensation chamber.

Single Stage Continuous Vapor Consolidation

Figure 3A:
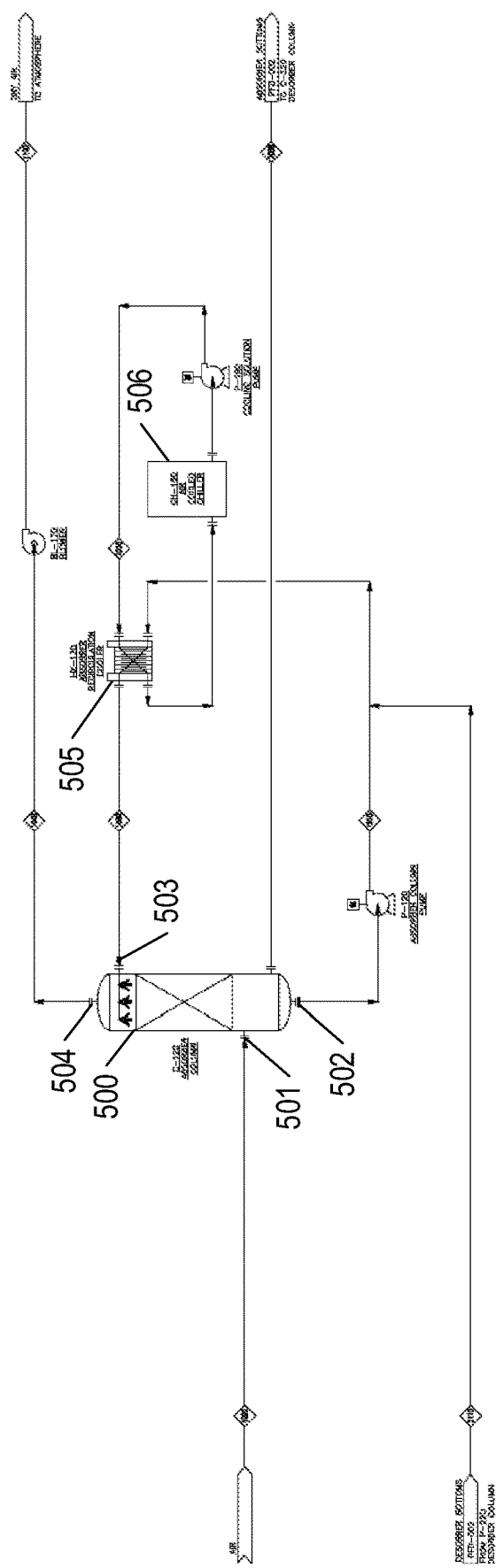
FIGS. 3A-3B show a schematic diagram of a continuous vapor consolidation system inline with a water vapor condensation system according to one embodiment.
Figure 3B:
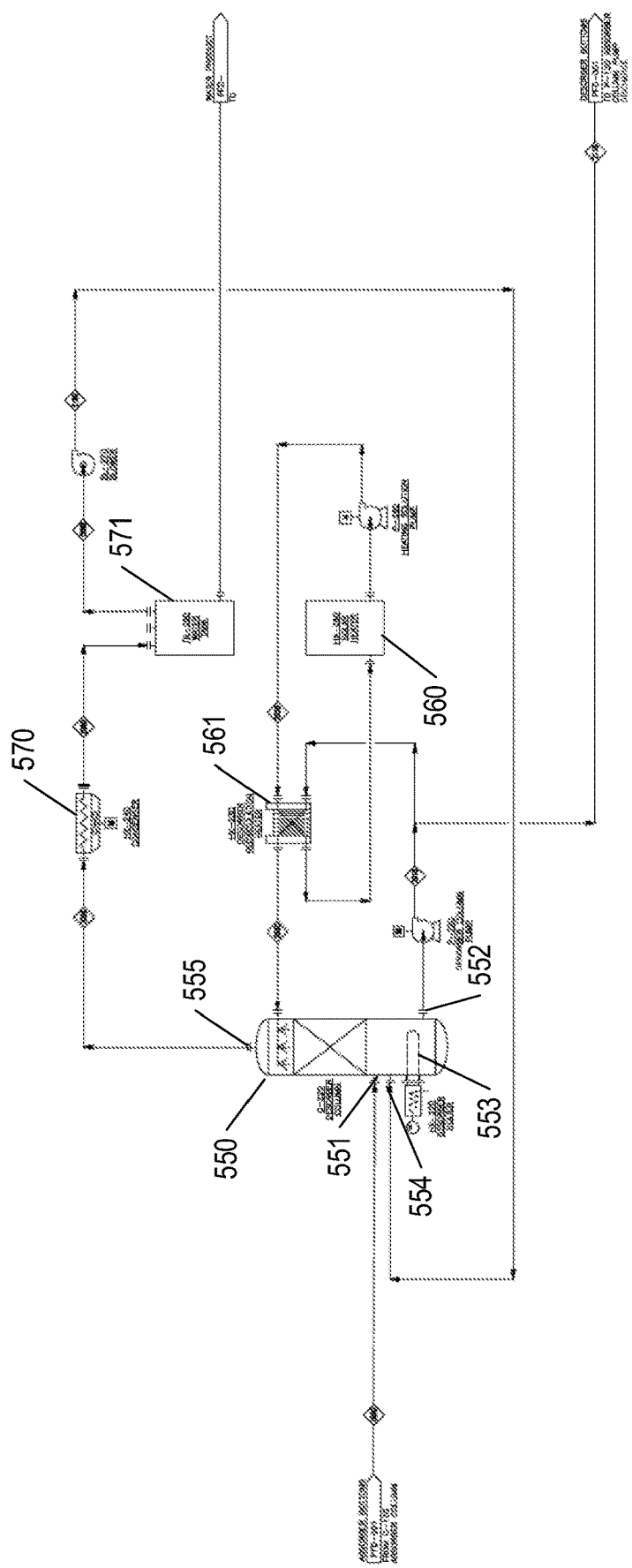

FIGS. 3A-3B illustrate a single-stage continuous vapor consolidation system according to an example embodiment. The single-stage continuous vapor consolidation system is configured to continuously absorb water from air in an absorption desiccant column 500 and to simultaneously evaporate water into air in a second, evaporation desiccant column 550. The absorption desiccant column 500 is in fluid connection with the evaporation desiccant column 550 (e.g., via a series of closable valves, such that desiccant solution may flow between the absorption desiccant column 500 and the evaporation desiccant column 550 as needed. In short, the desiccant solution absorbs water from air entering the system via an air input 501 while in the absorption column 500, and the diluted desiccant solution then exits the absorption column at a solution exit 502 passes through a series of fluid conduits and enters into the evaporation column 550 at a diluted input 551, where water in the desiccant solution is evaporated into a closed air stream. The concentrated desiccant solution exits the evaporation desiccant column at a rich solution exit 552 and travels into to the absorption column at a rich solution entrance 503 for another cycle. As shown in the figures, the various conduits may be optionally be closed to create closed loop systems at the absorber column 500 and the evaporation column 550, respectively.

As noted, the single-stage continuous vapor consolidation system comprises an absorption scrubber including an absorption desiccant column 500, and an evaporation scrubber including an evaporation desiccant column 550. In certain embodiments, the absorption desiccant column 500 operates at a low temperature (e.g., a temperature lower than an ambient temperature) to facilitate absorption of water vapor from air (passing through the absorption desiccant column 500 from air entrance 501 to air exit 504) into the desiccant solution. Accordingly, as concentrated desiccant solution is moved toward the absorption column 500, the desiccant solution may pass through a cooling recirculation loop to maintain the temperature of the desiccant solution at a desired temperature (e.g., at an ambient temperature or below an ambient temperature). The cooling recirculation loop may have a configuration similar to the cooling recirculation loop discussed above.

As just one example, concentrated desiccant solution moving toward the absorption column 500 (e.g., exiting the evaporation column) may be directed through a series of geothermal tubes having heat transfer properties with surrounding ground beneath the AWG system. The concentrated desiccant solution may directly pass through the series of geothermal tubes, or the concentrated desiccant solution may pass through a dual-fluid heat exchanger opposite a cooling fluid that is maintained at a desired low temperature via geothermal cooling. As yet another example as shown in FIG. 3A, the desiccant solution may pass through a heat exchanger (e.g., a shell-and-tube heat exchanger) to cool the desiccant solution. The heat exchanger may be cooled via a cooling solution that passes through a refrigeration circuit and/or other fluid chiller 506 to absorb heat from the desiccant solution before the desiccant solution enters the absorption column 500.

As yet another example, the single-stage water consolidation system may be positioned proximate a high-pressure gas well, such as proximate a natural gas well, an oil well (where natural gas is extracted simultaneously with oil), and/or the like. The high pressure gas may be directed through one or more expansion valves to regulate and/or decrease the pressure of the incoming gas, which, through the Joules-Thompson effect, experiences a rapid temperature decrease (following the gas law formula, the pressure of the gas rapidly decreases across the valve while the volume and amount of gas remains substantially constant, thereby causing a proportional rapid temperature decrease across the expansion valve). The expanded and super-cooled gas may be passed through a heat exchanger 505 opposite the concentrated desiccant solution, thereby absorbing heat from the concentrated desiccant solution and decreasing the temperature of the desiccant solution prior to entry into the absorption column 500 as described in referenced Provisional Application No. 62/459,462, filed Feb. 15, 2017 and incorporated herein by reference in its entirety. The expanded gas may then be directed away from the AWG system, where it may be collected for future use, flared off, utilized for power generation (e.g., via a steam turbine), and/or utilized to heat the desiccant solution entering the evaporation column, as discussed herein.

The absorption column 500 of the single-stage continuous vapor consolidation system may operate in a manner similar to the absorption phase of the single-stage batch vapor consolidation system described above. As mentioned, prior to entry into the absorption column 500, the desiccant solution is highly concentrated, such that the desiccant solution is highly receptive to absorbing additional water. As the desiccant solution passes through the absorption column 500, air having entrained water vapor is simultaneously passed through the absorption column (e.g., with a turbulent flow) to contact the air with the desiccant solution. Water vapor within the air is absorbed by the desiccant solution, which causes the humidity of the air to drop (such that dry air exits the desiccant column), the volume of the desiccant solution to increase, and the concentration of the desiccant solution to decrease. As the volume of the desiccant solution increases (and its concentration decreases) excess desiccant solution is directed toward the evaporation column 550 discussed herein. In certain embodiments, the absorption column 500 may be configured to create a concentration gradient of desiccant solution therein, such that highly concentrated desiccant solution enters through a solution input 503 proximate a first end of the absorption column 500 (e.g., a top of the absorption column 500), moves through the absorption column 500 and simultaneously absorbs water (thereby decreasing the concentration of the desiccant solution as it moves), and ultimately exits the absorption column 500 at a lower concentration at a solution exit 502 proximate a second end of the absorption column 500 (e.g., a bottom of the absorption column 500) opposite the first end. The absorption column 500 thereby has a concentration gradient between a high concentration portion at the first end and a lower concentration portion at the second end, such that low concentration desiccant solution exits the absorption column 500 to be directed to the evaporation column 550, while the desiccant solution is constantly replenished with high concentration desiccant solution within the absorption column 500.

Moreover, as shown in FIG. 3A, the absorption column 500 may be a part of a selectably closed loop for the desiccant solution, which may be pumped through the absorption column 500 and a cooling heat exchanger 505 in a continuous loop, without entering the evaporation column 550. The closed loop may be configured to enable the desiccant solution to absorb more water prior to entering the evaporation column 550. In such embodiments, the closed loop may be opened (e.g., by a controller system) upon the occurrence of a trigger event (e.g., upon measuring a desired desiccant solution concentration within the closed loop) as discussed in greater detail herein to enable the desiccant solution to move to the evaporation column 550.

Like the desiccant column discussed in the single-stage batch vapor consolidation system, the absorption column 500 may be embodied as a membrane-separated absorption column, having a desiccant flow path on a first side of a porous membrane, and an air flow path on an opposite, second side of the porous membrane. Separating the air flow path from the desiccant solution flow path may impede undesirable mass flow of the desiccant salt itself into the air flow path and ultimately out of the AWG system. Water may be absorbed by the desiccant solution from the air based on osmotic water flow through the membrane from the air to the desiccant solution. Water vapor may condense on the second side of the membrane, travel through the membrane pores through capillary action, and be absorbed by the high-salt content concentrated desiccant solution.

As yet another example, the absorption column 500 may have a structured packing configuration defined by a plurality of corrugated baffles stacked within the column and positioned in alternating orientations (each orientation rotated by 90 degrees relative to adjacent orientations). The corrugated baffles create a highly tortuous fluid flow path for the desiccant solution and the air, thereby increasing the overall available surface area of the desiccant solution exposed to the air within the column. This configuration maximizes the amount of water vapor absorbed by the desiccant solution passing through the absorption column 500.

As discussed above, the absorption column 500 may selectably operate in a closed loop, such that desiccant solution may be repeated recirculated through the cooling loop and the absorption column 500 until the desiccant solution reaches a threshold concentration. Accordingly, a control mechanism may be in communication with one or more sensors within the absorption column 500 (or external to the absorption column but within the closed absorption column loop) to monitor the concentration of the desiccant solution within the absorption column loop. Once the controller determines that the desiccant solution concentration has dropped to or below the threshold concentration level, the controller may send operational signals to one or more valves to direct at least a portion of the desiccant solution from the absorption column loop toward the evaporation column 550, and to direct a higher concentration desiccant solution from the evaporation column 550 into the absorption column loop. The controller may be configured to maintain the various valves in the open configuration until the measured concentration of the desiccant solution within the absorption column 500 rises to or above a threshold concentration level, at which time the controller may transmit operational signals to the various valves to close those valves and to reform the closed absorption loop. In certain embodiments, air may be continuously directed through the absorption column 500 regardless of whether the absorption loop is closed or open. However, in certain embodiments, the air flow may be passed through the absorption column 500 only while the absorption loop is closed, and the air flow may be blocked from entering the absorption column 500 while the absorption loop is in the open configuration. In such embodiments in which the absorption column 500 may be selectively operated in a closed loop, the single-stage continuous vapor consolidation system may additionally comprise a swing tank configured to support excess desiccant solution volume as the concentration of the desiccant solution decreases and the absorption loop remains closed.

Diluted desiccant solution that exits the absorption column 500 (or the absorption loop) is directed toward the evaporation column 550 where water is evaporated from the desiccant solution into a closed air system. To facilitate evaporation of the water from the desiccant solution, the diluted desiccant solution may be heated prior to and/or while present within the evaporation column 550. For example, the evaporation column 550 may include an embedded heater 553 (e.g., a resistance heater) configured to maintain the desiccant solution at a desired minimum temperature to facilitate evaporation of water from the desiccant solution. As yet another example, the desiccant solution may pass through a heating system prior to entry into the evaporation column. For example, the heating system may comprise a solar heating system 560 configured to utilize radiant and/or convective heat from the ambient environment to heat the desiccant solution to encourage water evaporation once the desiccant solution is within the evaporation column 550. In certain embodiments, the desiccant solution may pass through a series of solar-heated tubes (e.g., tubes having one or more solar collectors associated therewith to heat the tube and the fluid within the tube based on collected radiant solar energy) or the desiccant solution may pass through a dual-fluid heat exchanger 561 (e.g., a shell-and-tube heat exchanger) opposite a heating fluid, wherein the heating fluid is heated from a series of solar-heated tubes. In certain embodiments, the solar heating mechanism 560 may be supplemented by an electrical heater, a combustion heater (e.g., using expanded gas from the gas-expansion cooling mechanism discussed above), and/or the like, particularly during night-time system usage or when solar power is otherwise unavailable.

In various embodiments, the heating mechanism of the desiccant flow path may be configured to heat the temperature of the diluted desiccant solution to lower the vapor pressure of the fluid while the desiccant is present within the evaporation column 550. In certain embodiments, the heating mechanism is configured to heat the desiccant solution to a steady-state temperature of at least about 65-95 degrees Celsius.

The evaporation column 550 may operate as a desalination column to remove water from the desiccant solution. As air and heated desiccant solution pass through the desiccant column 550, water from the desiccant solution evaporates into the air, thereby increasing the concentration of the desiccant solution while simultaneously increasing the humidity of the air. The air passing through the evaporation column may be a part of a closed air loop (with no air exiting or entering the closed loop) such that evaporated water from the diluted desiccant solution is not lost to the surrounding environment. In such embodiments, the air within the closed loop may enter at a dry air inlet 554, pass through the evaporation column 550, and exit as humid air at a humid air outlet 555.

In certain embodiments, the absorption column 500 and the evaporation column 550 may be part of a continuous loop for the desiccant solution, such that the desiccant solution constantly flows from a first end of the absorption column 500 (where it enters as a high concentration solution) through the absorption column 500 (thereby absorbing water as it flows therethrough), and exiting the second end of the absorption column 500 as a diluted desiccant solution. The diluted desiccant solution may then flow through a heating mechanism where it is heated, and then into a first end of the evaporation column 550. The desiccant solution may then flow through the evaporation column 550, where it is concentrated due to water evaporation, and then out of a second end of the evaporation column 550 as a concentrated solution. The desiccant solution may then pass through a cooling mechanism and back into the first end of the absorption column 500. As the desiccant solution is circulated between the absorption column 500 and the evaporation column 550, two air flow streams may be passed through respective columns. A first, open air flow stream may be constantly circulated through the absorption column 500, with source air pulled from the ambient environment, passed through the absorption column 500, and exhausted to the environment as dry processed air. Simultaneously, a closed air flow stream may be cycled through the evaporation column 550, where it absorbs water from the diluted desiccant, and then through a condensation chamber 570 (as discussed herein) where water is condensed and ultimately collected in a water tank 571 from the humid air.

In certain embodiments, the single-stage continuous vapor consolidation system may comprise a membrane desalination system inline and upstream from the evaporation column 550 or instead of an evaporation column 550. In the membrane desalination system, the desiccant flow path may flow past a first side of a membrane, such that the desiccant solution contacts the membrane as it travels along the desiccant flow path. The membrane may separate the desiccant solution flow path from a water flow path for water collected from the condensation process described herein. The water flow path may pass a second side of the membrane such that the water contacts the second side of the membrane as it flows along the water flow path.

The membrane may comprise a porous membrane, such as a non-woven membrane having a small pore size. As just one example, the membrane may comprise ePTFE. As the desiccant solution and the water flow past opposite sides of the membrane, water molecules migrate from the high-salt content desiccant solution through the membrane (via capillary action), to the water flow. Accordingly, as the diluted desiccant solution passes through the membrane system prior to entry into the evaporation column 550, a first quantity of water is removed from the desiccant solution at the membrane system before the desiccant solution enters the evaporation column 550 for evaporation of additional water therefrom.

Like the absorption column 500, the evaporation column 550 may be selectively operated in a closed loop, such that desiccant solution may be repeated recirculated through the heating mechanism and the evaporation column 550 until the desiccant solution reaches a threshold concentration. Accordingly, a control mechanism may be in communication with one or more sensors within the evaporation column 550 (or external to the evaporation column but within the closed evaporation column loop) to monitor the concentration of the desiccant solution within the evaporation column loop. Once the controller determines that the desiccant solution concentration is raised to or above the threshold concentration level, the controller may send operational signals to one or more valves to direct at least a portion of the desiccant solution from the evaporation column loop toward the absorption column 500, and to direct a lower concentration desiccant solution from the absorption column 500 (e.g., the absorption column loop) into the evaporation column loop. The controller may be configured to maintain the various valves in the open configuration until the measured concentration of the desiccant solution with the evaporation column 550 falls to or below a threshold concentration level, at which time the controller may transmit operational signals to the various valves to close those valves and to reform the closed evaporation loop. In certain embodiments, air may be continuously directed through the evaporation column regardless of whether the evaporation column loop is closed or open. However, in certain embodiments, the air flow may be passed through the evaporation column only while the evaporation column loop is closed, and the air flow may be blocked from entering the evaporation column while the evaporation column loop is in the open configuration.

Moreover, in certain embodiments the operation of the various valves for opening and closing the absorption column loop and the evaporation column loop may be synchronized, such that the loops are simultaneously in the open configuration or simultaneously in the closed configuration. In such embodiments, the trigger events for opening and/or closing the evaporation and absorption column loops may be based on a concentration measured within only one column loop (e.g., based on the measured concentration of the desiccant solution within the absorption loop or based on the measured concentration of the desiccant solution within the evaporation loop). In other embodiments, the trigger event for opening/closing the various valves may be based on measured concentrations of the desiccant solution within both the absorption loop and the evaporation loop. For example, the controller may be configured to open the valves to pass desiccant solution between the evaporation column and the absorption column upon determining that either the solution concentration within the evaporation column rises to/above a threshold value or the solution concentration within the absorption column falls to/below a threshold value. As yet another example, the controller may be configured to open the valves to pass desiccant solution between the evaporation column 550 and the absorption column 500 upon determining that both solution concentrations within the evaporation column and the absorption column satisfy respective thresholds.

Similarly, the controller may rely on measurements of one or both solution concentrations within the evaporation loop and/or the absorption loop when determining when to close the valves to separate the desiccant solution between the respective absorption loop and the evaporation loop.

In certain embodiments, the single-stage continuous vapor consolidation system may be part of an AWG system comprising one or more air preconditioning systems. For example, the air preconditioning system may be located upstream of the absorption column, such that source air entering the AWG system first passes through the air preconditioning system prior to entering the absorption column. Moreover, the AWG system may comprise an air preconditioning system as discussed herein between the evaporation column and the condensation chamber.

An example system may be configured for producing at least approximately 180 gallons of water per day based on an ambient air temperature of 95° F. and an ambient relative humidity level of 30%. Ambient air may be provided to the absorption column at a flow rate of at least approximately 2800 cubic feet/minute to pass through a packed column directing a rich lithium chloride solution having a concentration of between about 38-45 wt % (e.g., about 40 wt %). Water may be absorbed by the lithium chloride solution and the concentration of the lithium chloride solution may fall to a lean concentration level of about 38-40 wt % (e.g., about 38.6 wt %) before the desiccant solution is directed out of the absorption column. During the absorption process, the absorption column may be maintained at a temperature of at least approximately 80-90 degrees Fahrenheit.

The lean desiccant solution may be heated and directed to an evaporation column operating at a temperature of at least approximately 180-190 degrees Fahrenheit to evaporate the absorbed water into a closed loop of air. The air may then be passed to a condensation chamber, where water vapor is condensed into liquid water at rate of at least approximately 180 gallons/day.

The above-mentioned example system may additionally comprise a carbon dioxide capture system as discussed in greater detail herein. In such embodiments, the air flow of approximately 2800 cubic feet/minute may be passed through the carbon dioxide capture column, and at least approximately 1.1 tons of carbon dioxide may be captured per day. The quantity of carbon dioxide produced, water generated, and air flow rate are interrelated, such that an adjustment to any one of these rates will change the others.

Multi-Stage Continuous Vapor Consolidation

The multi-stage continuous vapor consolidation system is configured to absorb water from air in one or more absorption desiccant columns and to simultaneously evaporate water into air in one or more evaporation desiccant columns similar to those discussed above. For example, the multi-stage continuous vapor consolidation system may be configured as two or more single-stage continuous vapor consolidation systems operating in parallel, and together with a single condensation system. In certain embodiments, a single evaporation column may be in fluid communication with two or more absorption columns such that a single desiccant solution may be passed through all of the absorption columns in series and/or in parallel. The plurality of absorption columns may comprise a first, high concentration absorption column and a second, low concentration absorption column. The high concentration absorption column may comprise highly concentrated desiccant solution (e.g., desiccant solution passed immediately from the evaporation column), while the low concentration absorption column may comprise lower concentrated desiccant solution (e.g., at least a portion of the desiccant solution from the high concentration absorption column may pass through the lower concentration absorption column).

Moreover the plurality of absorption columns may be arranged in series within the air flow path, such that source air may be pulled from the environment and passed through the plurality of absorption columns in series prior to being exhausted back to the environment as dry air. For example, the source air may be first passed through the low concentration absorption column to absorb a first quantity of water from the air, then may be passed through the high concentration absorption column to absorb a second quantity of water from the air. Because the initial absorption requires less energy (and does not require a low vapor pressure between the air and the liquid desiccant), the initial absorption using the lower concentration desiccant solution enables absorption of a first quantity of water from the air. After the initial, low energy requirement absorption process is completed, the air (which still contains water vapor) is passed through the second absorption column having a higher concentration desiccant solution, such that a second quantity of water is absorbed from the air. The now dry (e.g., low humidity) air may then be exhausted from the system to the environment.

On the desiccant side, once the diluted desiccant exits the low concentration absorption column, the desiccant solution passes to an evaporation system as discussed herein, where the desiccant solution is heated and passed through an evaporation column where water is evaporated into a closed air flow loop.

In certain embodiments, each absorption column may be in fluid communication with a corresponding evaporation column, and each absorption column—evaporation column pair may comprise separate desiccant flow loop. For example a first quantity of desiccant solution may flow between a first absorption column and a first evaporation column, and a second desiccant solution may flow between a second absorption column and a second evaporation column, and the first quantity of desiccant solution does not mix with the second quantity of desiccant solution. In certain embodiments, the first quantity of desiccant solution may comprise a first desiccant (e.g., LiCl) and the second quantity of desiccant solution may comprise a second desiccant (e.g., CaCl).

Moreover, in embodiments comprising a plurality of independent desiccant flows, each desiccant flow may have a different concentration range. For example, a first desiccant flow (e.g., corresponding to a first absorption column passed through by source air) may have a first concentration range measured between a high concentration value at an exit of the evaporation column and a low concentration value at an exit of the absorption column; and a second desiccant flow may have a second concentration range. As the source air is directed through the absorption columns in series, the air may be directed through a low concentration range absorption column first, and may be directed through a high concentration range absorption column second.

In various embodiments, each of the absorption column—evaporation column combination may operate in a manner similar to that discussed above in relation to the single-stage continuous vapor consolidation system.

Condensation Process

Processed air (which may comprise air exiting the pre-conditioning system and/or air exiting one or more humidity increasing systems) may be passed through a condensation chamber as discussed herein to condense water vapor in the air into usable liquid water.

The condensation chamber may be embodied as a heat exchanger (e.g., a cross-flow heat exchanger) or another chamber having a series of chilled condensation surfaces on which water vapor condenses into liquid water. For example, the condensation chamber may comprise a series of tubes and/or coils (e.g., metallic tubes and/or coils) in which the processed air passes through. The exterior surfaces of the tubes and/or coils are chilled (e.g., by a refrigerant, a super-cooled gas, a cooled liquid, and/or the like) such that water in the processed air condenses on the interior surfaces of the tubes and/or coils. In such embodiments, the tubes and/or coils may be angled, such that the condensed water streams out of the tubes and/or coils and into a retention chamber.

As yet another example, the condensation chamber may comprise a series of chilled tubes and/or coils (e.g., having super-cooled gas, refrigerant, cooled liquid, and/or the like flowing through the interior of the chilled tubes and/or coils), and the processed air may run across the exterior surface of the chilled tubes and/or coils such that water condenses on the exterior surfaces of the tubes and/or coils.

It should be understood that the condensation surfaces may have any of a variety of shapes and/or configurations.

As mentioned, condensed water flows off of the condensation surfaces into a retention chamber. The retention chamber may comprise one or more water catch trays positioned under the condensation surfaces and configured to capture water dripping off of the condensation surfaces. The water catch trays may be angled toward a holding reservoir configured to hold a volume of water collected via the condensation process. In certain embodiments, the holding reservoir may comprise one or more water outlets in fluid communication with liquid conduits leading to one or more external systems, such as agricultural systems, potable water systems, and/or the like.

Carbon Dioxide Process

Processed air (which may comprise air exiting a water consolidation system as discussed herein) may be passed through a carbon dioxide capture system prior to exhaustion to the atmosphere. The carbon dioxide may be captured from the air for filtration and/or disposal (e.g., through one or more chemical processes to convert the carbon dioxide into water, oxygen, and/or a solid or liquid composition that may be disposed of; through capture of the carbon dioxide in a filtration media; and/or the like).

As shown in the illustrative example of FIG. 1, the carbon dioxide capture system may comprise a carbon dioxide capture column 102 having a fixed bed of a carbon dioxide absorbing material (e.g., a sodium hydroxide solution). As air is passed over the carbon dioxide absorbing material, the carbon dioxide is absorbed by the material. Moreover, as shown in FIG. 1, the carbon dioxide capture column 102 may be heated (e.g., with a hot fluid jacket) to facilitate increased carbon dioxide absorption by the absorbing material.

As yet other examples, the carbon dioxide capture material may be configured to reversibly absorb the carbon dioxide, such that the captured carbon dioxide may be compressed and stored as a gas for later use.

In certain embodiments, captured carbon dioxide gas may be directed to a greenhouse to optimize the internal greenhouse environment for plant growth. As discussed herein, the greenhouse may be supplied by water generated by the AWG system discussed herein.

Power Generation Processes

Certain embodiments of the foregoing AWG system may incorporate one or more power-consuming components, such as air blowers, gas/air compressors, liquid fluid pumps, resistance heaters, monitoring computing devices, and/or the like. These components (as well as other power-consuming components of various embodiments) may receive electrical power from one or more integrated power generation mechanisms of the described system. As noted above, certain embodiments may be operated proximate hydrocarbon fuel wells, and off-gases (e.g., natural gas) from those fuel wells may be combusted and utilized to generate power through energy-generating turbines (e.g., steam turbines). As yet another example, various embodiments may comprise one or more solar heat-generating mechanisms as discussed above, and these solar-heat generating mechanisms may additionally comprise one or more electrical energy generation mechanisms for converting solar energy into storage electrical energy (which may be stored via one or more batteries, uninterruptable power supplies (UPSs), and/or the like.

Moreover, the AWG system and/or power generating aspects of the AWG system may be associated with a greenhouse or other agricultural system for facilitating plant growth (e.g., consumable plant growth). Thus, the power generation systems may be configured to provide electrical power to various aspects of the agricultural system, such as heating/cooling mechanisms for air within the greenhouse, air circulation blowers within the greenhouse, artificial growth lights within the greenhouse, water/irrigation pumps within the greenhouse, agricultural robots (e.g., planters, harvesters, and/or the like) within the greenhouse, and/or the like.

Figure 7:
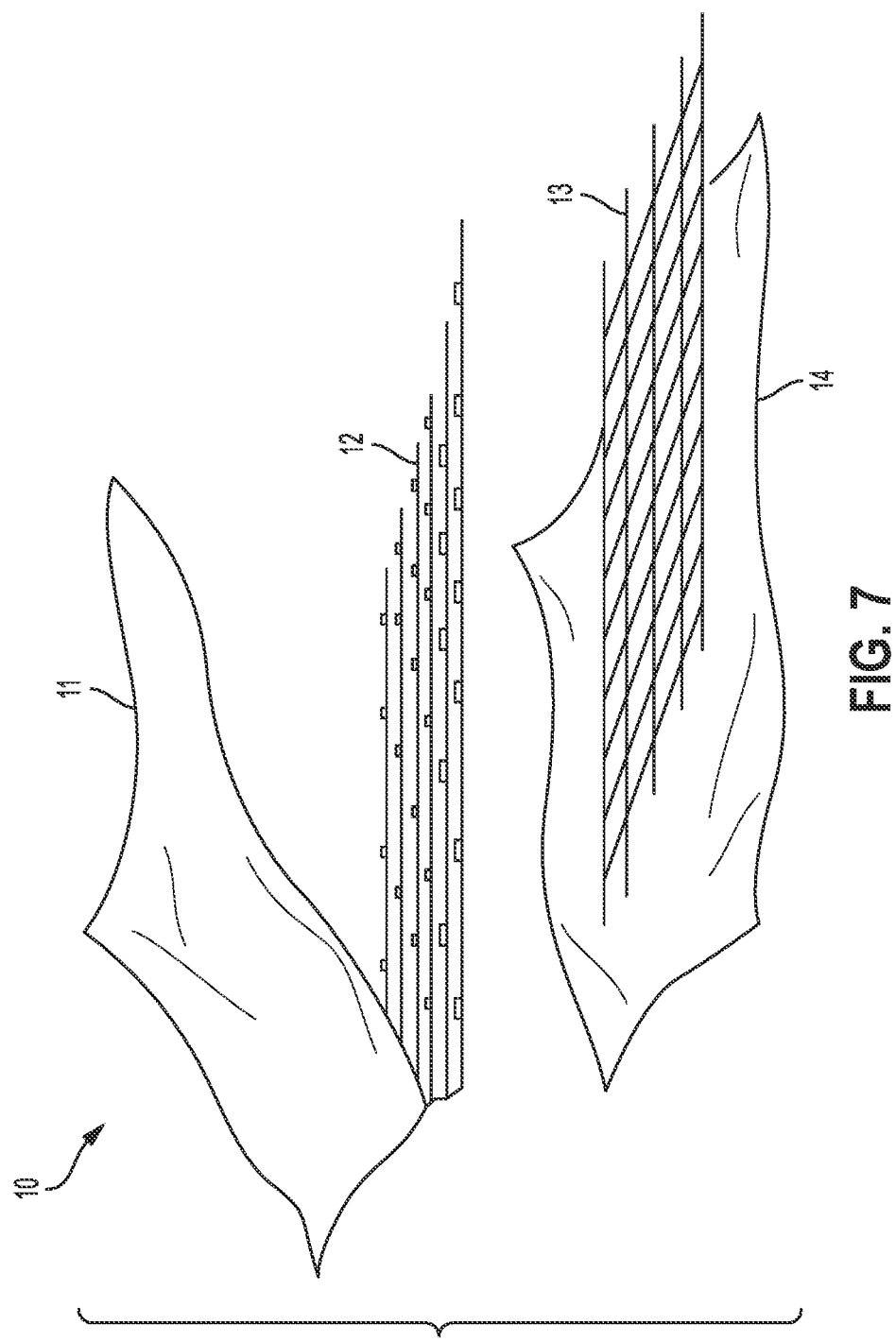
FIG. 7 shows an exploded view of a surface covering according to one embodiment.
Figure 8:
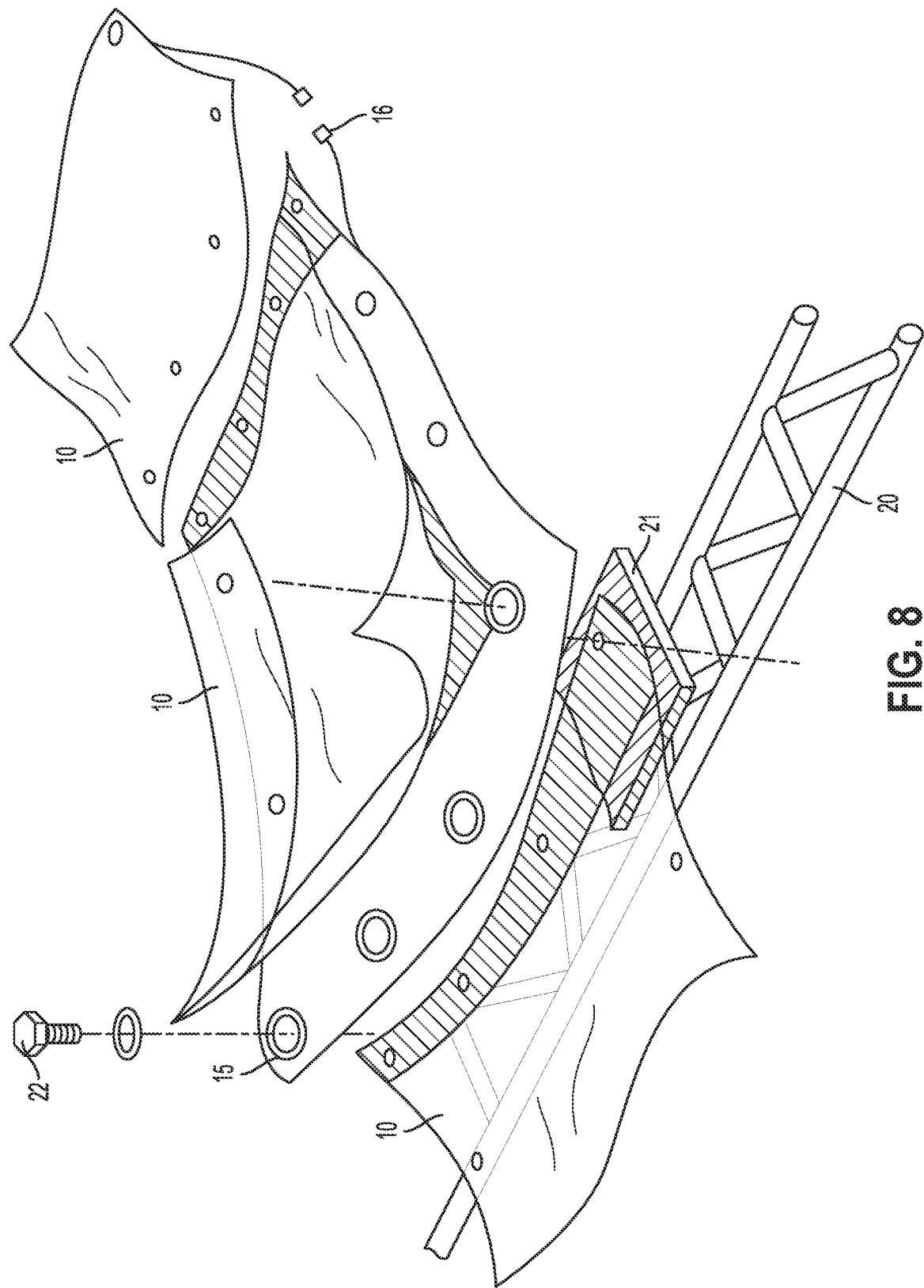
FIG. 8 shows an example view of a surface covering panel secured relative to a support frame.

As just one example, a solar canopy material 10 may be provided as a covering material of a plant growth habitat as discussed in greater detail herein. The solar canopy 10 may be embodied as a transparent or translucent sheet configured to enable sunlight to pass through the solar canopy 10. However, it should be understood that the sheet may be opaque in certain embodiments to prevent external light from passing through the solar canopy material 10. As shown in FIGS. 7-8, the solar canopy may additionally comprise photovoltaic elements 13 (e.g., patches, strips, and/or the like) embedded within the solar canopy 10. Those photovoltaic elements 13 may be configured to convert radiant sunlight into electrical energy that may ultimately be stored via one or more batteries, or utilized in one or more electrical circuits that may be embedded within the solar canopy 10. For example, the solar canopy may additionally comprise one or more light emitting diode (LED) light sources 12 embedded therein that may be configured for providing light (e.g., ultraviolet light) to plants within the plant growth habitat. The LEDs may be directional such that light may be provided in a fixed direction relative to the LED, or the LEDs may be omnidirectional, such that light is emitted around the entire perimeter of the LED.

As a specific example, the solar canopy material 10 may be embodied as a multi-layer flexible sheet (e.g., a plastic sheet, a fabric sheet, and/or the like) that may be draped or otherwise secured over a frame 20 of a plant growth habitat. The solar canopy material 10 may be at least substantially transparent or translucent, and may be configured to allow ultraviolet light to pass through the solar canopy material 10. The solar canopy material 10 may have a high tensile strength, and may be resistant to tears and/or punctures. In certain embodiments, the solar canopy material 10 may comprise one or more reinforcing threads, tapes, and/or the like embedded within the solar canopy material. For example, the reinforcing threads, tapes, and/or the like may comprise Kevlar threads, metallic threads, and/or the like.

In certain embodiments, the solar canopy material 10 comprises a first protective sheet 11 defining a top surface of the solar canopy material 10, and/or a second protective sheet 14 defining a bottom surface of the solar canopy material 10. In certain embodiments the first protective sheet 11 and/or second protective sheet 14 may comprise a woven material (e.g., a woven fabric, woven carbon fiber, and/or the like), a non-woven material (e.g., a high-strength plastic membrane), and/or the like. In certain embodiments, each of the first protective sheet 11 and/or second protective sheet 14 may individually comprise a plurality of layers, including, for example, one or more covering layers defining the outermost layers of the solar canopy material 10, a reinforcing layer (e.g., comprising the one or more reinforcing threads, tapes, and/or the like), and/or the like.

The first protective layer 11 and/or second protective layer 14 may cover one or more electrical layers of the solar canopy material 10. For example, the electrical layers may comprise a layer comprising a plurality of LED elements 12 and/or a layer comprising one or more photovoltaic elements 13. These layers may be separate layers secured relative to one another via an adhesive material, or these electrical systems may be incorporated into a single layer of the solar canopy material 10 secured relative to the first and/or second protective layers 11, 14 via an adhesive material.

In certain embodiments, the photovoltaic elements 13 (e.g., strips, patches, and/or the like) may be embedded within the solar canopy material 10 as an array of photovoltaic elements 13, and may be configured to collect sunlight. The photovoltaic elements 13 may thus have a collection side facing an outer side of the solar canopy material 10. The photovoltaic elements 13 may be spaced apart from one another within the solar canopy material 10 as desired, such that sunlight is enabled to pass between the photovoltaic elements 13 and through the solar canopy material 10. For example, the photovoltaic elements 13 may be spaced at regular intervals within the solar canopy material 10.

The photovoltaic elements 13 may be electrically connected to conductors embedded within the solar canopy material 10 configured to direct electricity away from the photovoltaic elements 13. In certain embodiments, the electricity may be directed to a storage device, such as a battery and/or a UPS for later use by various portions of the AWG system, the plant growth habitat, and/or the like. In certain embodiments, the electricity may be provided as Direct Current (DC) for storage and/or use. In certain embodiments, the generated DC electricity may be provided to a power converter configured to convert the DC electricity into Alternating Current (AC) energy for use by various components and/or to be supplied to a connected power grid.

As mentioned above, the solar canopy material 10 may additionally comprise one or more embedded LEDs 12 connected within an LED array configured to emit light from and/or through at least a portion of the solar canopy material 10. In certain embodiments, the embedded LEDs 12 may be directed through an inner side of the solar canopy material 10 (e.g., through a second protective layer 14), opposite the outer side of the solar canopy material 10, such that the LEDs 12 emit light through the inner side of the solar canopy material 10. In certain embodiments the LEDs may be aligned with the one or more photovoltaic elements 13 and may be configured to emit light toward a back side of the photovoltaic elements 13, such that the light reflects off of the back side of the photovoltaic elements and through the inner side of the solar canopy 10. The LEDs 12 may additionally be connected to one or more conductors (which may be provided in series with the photovoltaic elements 13, in parallel with the photovoltaic elements 13, or in a separate circuit from the photovoltaic elements 13).

As yet another embodiment, various LEDs may be suspended from the solar canopy 10. For example, LEDs may be suspended within a growth habitat of an agricultural module 1000 surrounded by one or more solar canopies 10, such that the LEDs provide additional light to plants growing therein from additional angles (e.g., proximate a growth medium in which the plants are growing).

In certain embodiments, the solar canopy material 10 may be embodied as separate solar canopy panels having finished edges. The finished edges may comprise smooth edges configured to impede fraying and/or tearing. For example, the edges may be sewn, melted, and/or the like. In certain embodiments, the finished edges may comprise one or more grommets or other attachment mechanisms 15 proximate each of the finished edges. The attachment mechanisms 15 may be configured to attach the solar canopy panels 10 relative to a frame 20 (e.g., via one or more fasteners 22 secured relative to a mounting plate 21) and/or relative to adjacent solar canopy panels 10. The attachment mechanisms 15 may be spaced a distance away from the finished edges (e.g., 1 inch) and may be spaced along a line provided parallel with each of the finished edges. In certain embodiments, attachment mechanisms 15 for adjacent solar canopy panels 10 may be configured for engagement therebetween, such that adjacent solar canopy panels 10 may be joined via the one or more fastener mechanisms 15. In certain embodiments, the solar canopy panels may additionally comprise one or more electrical connection mechanisms 16 configured to enable conductors of adjacent solar canopy panels 10 to be connected in series. In certain embodiments, solar canopy panels 10 may comprise a first set of electrical connectors 16 configured for connecting conductors of the photovoltaic portion circuit for adjacent solar canopy panels 10, and a second set of electrical connectors 16 configured for connecting conductors of the LED lighting circuits for adjacent solar canopy panels 10.

The solar canopy panels 10 may additionally comprise one or more overlap flaps (not shown) configured to extend beyond the smooth finished edges. The overlap flaps extend beyond the attachment mechanisms 15, and provide a sealing overlapped portion extending across a joint between adjacent and connected solar canopy panels 10. The sealing overlapped portion is configured to minimize the amount of air that can flow between adjacent and connected solar canopy panels 10, for example, to prevent air from escaping from the interior of a plant growth habitat enclosed with a plurality of connected solar canopy panels 10. In certain embodiments, the sealing overlapped portion may comprise a material shared with remaining portions of the solar canopy panel 10. However, it should be understood that the sealing overlapped portion may comprise a material different from the materials of the solar canopy panel 10. For example, the sealing overlapped portion may comprise a tacky surface configured to detachably adhere to a surface of the solar canopy panel 10 to provide additional sealing against undesirable air leakage from between the secured solar canopy panels 10.

In certain embodiments, the solar canopy material 10 may be configured for use with a translucent covering layer configured for permitting only low levels of light to pass to the solar canopy material. For example, the solar canopy material 10 may be utilized to underlay visual advertisements, such as billboards having a printed, translucent advertisement sheet placed over the solar canopy material. The photovoltaic elements 13 of the solar canopy material 10 may be configured to collect light as it is filtered through the overlaid advertisement sheet.

Agricultural Module

Figure 4:
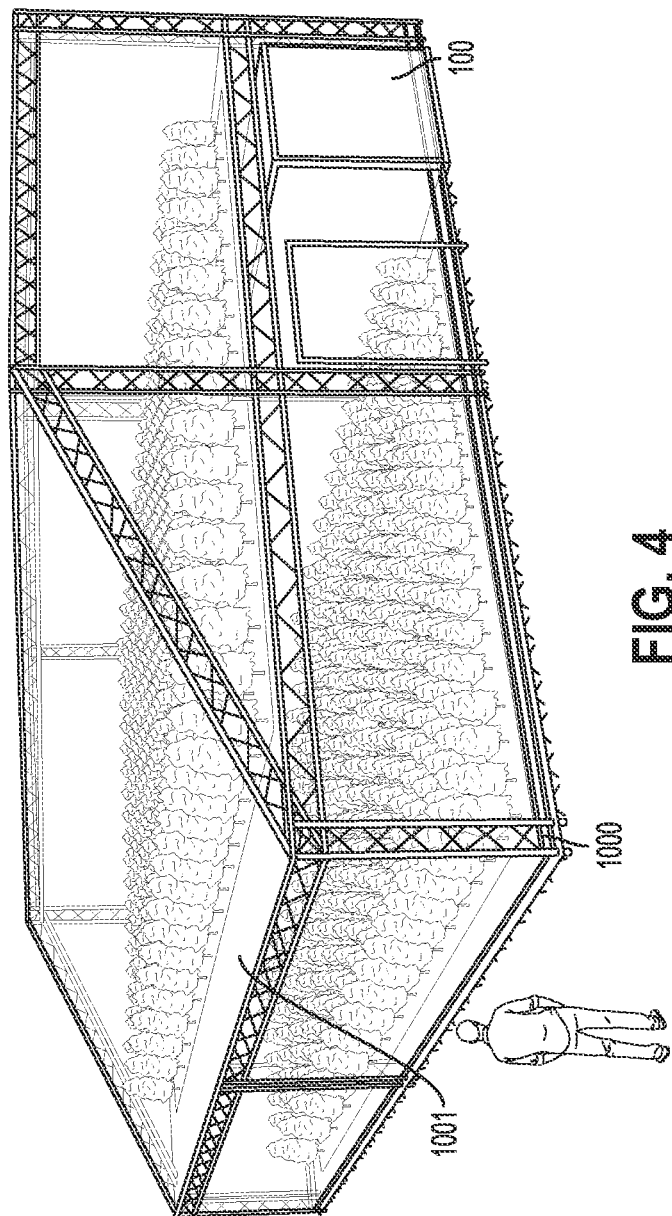
FIG. 4 is an example implementation of a vapor consolidation system with an agricultural module according to one embodiment.
Figure 5:
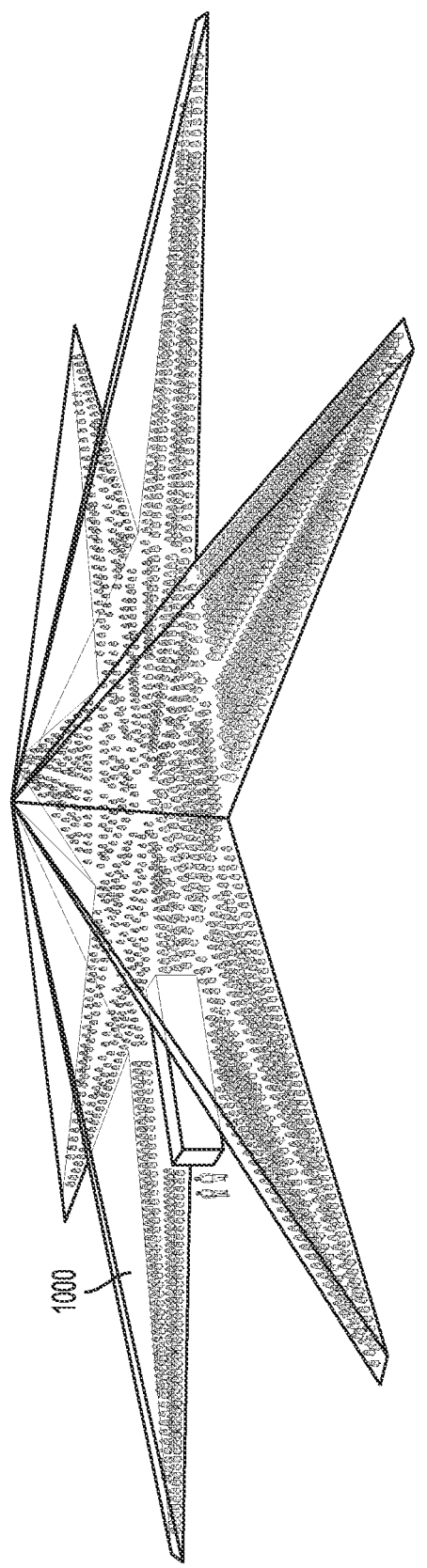
FIG. 5 is another example implementation of a vapor consolidation system with an agricultural module according to one embodiment.

The AWG system may be utilized to generate water and/or power to be supplied to an agricultural module, which may comprise a greenhouse, plant growth habitat, and/or other structure that may be utilized to encourage plant growth within controlled atmospheric conditions. FIGS. 4-5 illustrates various embodiments of an agricultural module 1000 in association with an AWG system 100 housed within a shipping container according to one embodiment. As shown in the figures, the agricultural module 1000 may define a plant growth habitat having an at least substantially rectangular shape, or a shape with a plurality of separate lobes (e.g., to form a star-shape, as shown in FIG. 5). In embodiments comprising separate lobes, the volume within each lobe may be separated from the remainder of the growth habitat, such that each lobe may be provided with a unique growth environment (e.g., different temperatures, carbon dioxide levels, humidity levels, and/or the like) to foster growth of different agricultural products.

Figure 6:
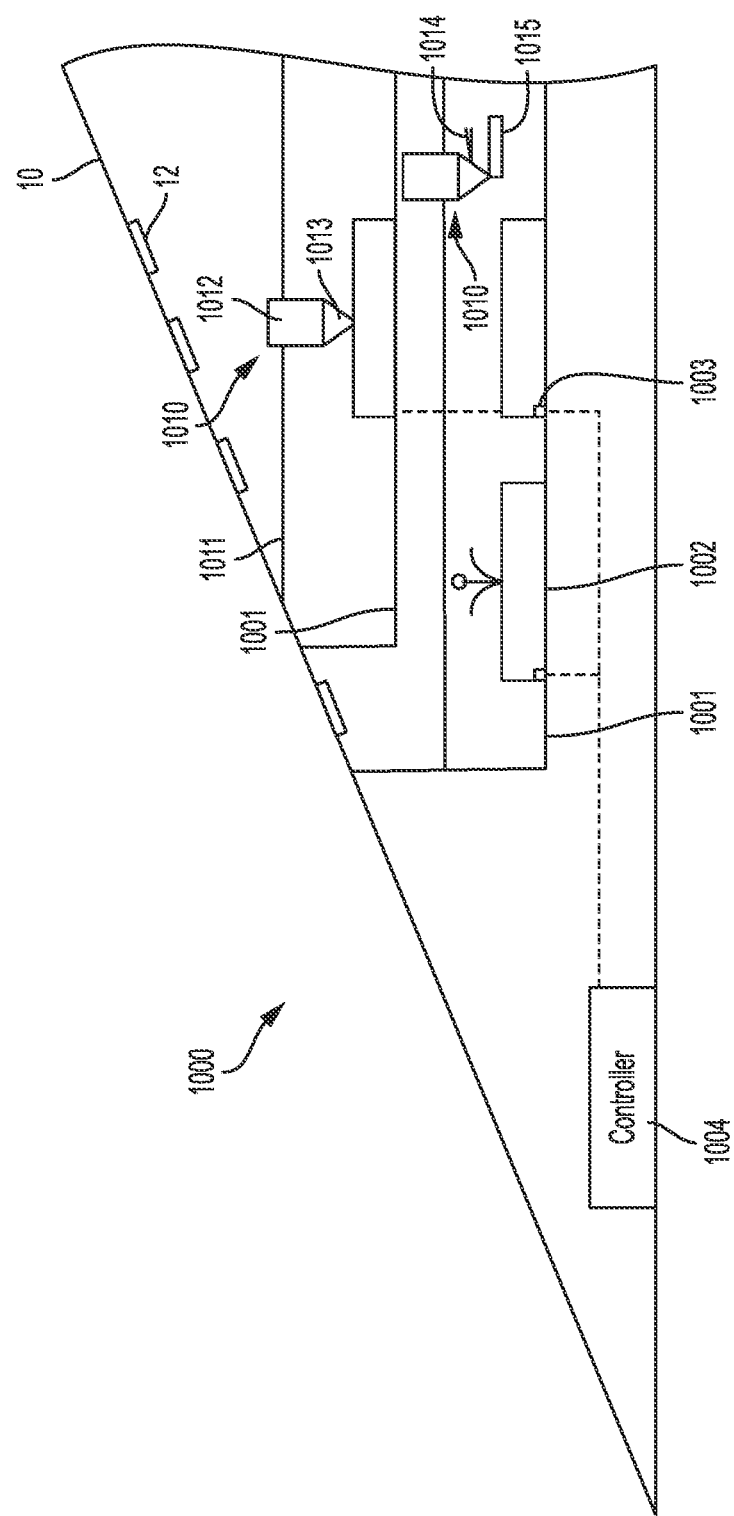
FIG. 6 illustrates an automated planting mechanism according to one embodiment.

FIG. 6 shows a schematic detail view of a portion of a growth habitat of an agricultural module 1000 according to one embodiment. The growth habitat of the agricultural module 1000 may comprise one or more stackable structures 1001 each having one or more base portions 1002 configured to support a growth medium (e.g., soil, a hydroponic support, and/or the like) one or more sidewalls and a ceiling. The stackable structures 1001 may be suspended from support frames of the growth habitat, may be stacked such that the support of an upper structure is supported by a lower structure, and/or the like. The one or more sidewalls and ceiling are configured to contain the controlled atmospheric conditions within the structure (e.g., environmental air having controlled oxygen and carbon dioxide levels, controlled temperature, controlled humidity, and/or the like). The one or more sidewalls and ceiling may comprise a covering material, such as a flexible covering material, a rigid covering material, and/or the like. In certain embodiments, the covering material may comprise integrated growth lamps (e.g., light emitting diode growth lamps) and/or integrated electrical circuitry and/or may be configured to enable natural sunlight to pass through the covering material to the contained environment. In certain embodiments, the integrated growth lamps may be spaced at regular intervals throughout the flexible covering material, and may be electrically connected relative to one another and/or relative to one or more power sources via electrical circuitry. For example, in the illustrated embodiment of FIG. 6, the covering material comprises a solar canopy 10 as discussed herein, with integrated LEDs 12 spaced across the surface of the canopy 10.

In embodiments comprising flexible covering materials, the agricultural module may comprise one or more rigid supports collectively forming a rigid support frame for the flexible covering material.

In certain embodiments, the agricultural module 1000 may be embodied as a portable system that is configured to be quickly set up at a desired agricultural site. The agricultural module 1000 may additionally comprise one or more sensors 1003 that may be provided within the growth medium of the growth habitat. These sensors may be embodied as a portion of a flexible bundle of electrical circuitry, including conductors, sensors, and/or the like that may be quickly deployed within a growth habitat by unrolling the bundle onto a support surface of the growth habitat before providing the growth medium therein. In certain embodiments, the various sensors may be electrically connected relative to one another, relative to a control computing system 1004, and/or relative to a power source via one or more conductors (e.g., flexible conductors). The various sensors may comprise moisture sensors, temperature sensors, carbon dioxide content sensors, oxygen sensors, humidity sensors, and/or the like. It should be understood that certain of the described sensors may be configured for wireless data transmission to a control computing system via one or more wireless communication technologies, such as Wi-Fi, Bluetooth, Internet of Things (IoT) technologies, and/or the like.

In certain embodiments, sensor outputs (e.g., indicative of measured aspects of the environment within the growth habitat) may be utilized by the control computing system 1004 to regulate the environmental conditions within the growth habitat. For example, the control computing system 1004 may comprise data indicative of one or more target environmental conditions, such as a target temperature, target carbon dioxide content, and/or the like. Based on the monitored data output from the various sensors 1003 within the growth habitat, the control computing system 1004 is configured to compare the monitored data output against the target environmental conditions, and may be configured to adjust water flows, carbon dioxide flows, and/or the like from the AWG 100 into the growth habitat. For example, the control computing system 1004 may be configured to automatically activate sprinkler (or drip irrigation) systems (which may be incorporated into the stackable structures 1001) within the growth habitat to water the plants within the growth habitat in response to predetermined conditions; to increase and/or decrease the amount of carbon dioxide flowing into the growth habitat from carbon dioxide capture systems of the AWG system 100, and/or the like.

Moreover, the growth habitat may comprise one or more automated planting and harvesting mechanisms configured to autonomously plant seeds for new plants, and/or to automatically harvest fruits and/or vegetables grown within the growth habitat (this includes the use of agricultural robots and drones).

For example, seed planting/management may be provided via a planting probe 1010 operable to move along a grid/track system 1011 elevated above a support surface of the growth habitat. In certain embodiments, the grid/track system 1011 may be raised and/or lowered via a support mechanism (e.g., a pneumatic and/or hydraulic support mechanism). The planting probe 1010 may be operable in response to signals received from the control computing system 1004, which comprises data indicative of an internal mapping of the planting medium and/or base portions 1002 within the growth habitat. The control computing system 1004 additionally comprises data indicative of a desired crop, crop spacing, and/or the like for planting within the growth habitat, and may provide movement signals to the planting probe 1010 to insert seeds into the planting medium according to a desired planting plan.

The planting probe 1010 itself may comprise a hopper 1012 configured to hold a volume of seed, and an insertion probe 1013 (e.g., a wedge shaped insertion probe) configured to inject seed at an appropriate depth within the planting medium (as determined by the control computing system 1004). The planting probe 1010 additionally comprises a movement mechanism (e.g., one or more motors) configured to move the planting probe 1010 along the track/grid to plant seeds within the planting medium. Moreover, the planting probe 1010 may be configured to periodically return to a refill position within the growth habitat to retrieve additional seed within the included hopper 1012. The refill position may be positioned within the growth habitat, proximate a fill chute containing additional seed that may be selectably provided to the planting probe 1010 as needed. In certain embodiments, the fill chute may be embodied as a container supported (e.g., suspended) above the movement path of the planting probe, such that the planting probe 1010 may move below the fill chute to be refilled by gravitational force moving the seed from the fill chute into the planting probe 1010. Moreover, in certain embodiments the fill chute may comprise an actuatable feed door (e.g., a servo-actuated feed door) configured to open and allow a flow of seed out of the feed chute in response to a signal received from the control computing system 1004. Thus, when the planting probe 1010 is positioned beneath the feed chute, the control computing system 1004 may be configured to open the feed door to enable seed to flow from the feed chute to the planting probe 1010. Once an appropriate amount of seed has been provided to the planting probe 1010, the control computing system 1004 may transmit a second signal causing the feed door to close.

The planting probe 1010 may additionally comprise a harvesting mechanism that may be detachably secured relative to the movable planting probe 1010. The harvesting mechanism may comprise a mechanically movable cutting/picking arm 1014 and a holding basket/tray 1015. Once the planting probe 1010 receives signals from the control computing system 1004 to initiate the harvest process, the planting probe 1010 may process to pick and/or cut produce/plants from the various plants within the growth habitat, and to deposit the cut produce/plants into the holding basket/tray 1015. Once the holding basket/tray 1015 is full, the planting probe 1010 may return to a docking position, where the holding basket/tray 1015 may deposit the harvested items into a retention crate that may be removed from the growth habitat. Moreover, in certain embodiments the retention crate may comprise one or more level sensors configured to monitor the amount of harvested items within the retention crate to avoid the retention crate from overflowing. Upon detecting that the retention crate fill level is above a threshold level, the control computing system 1004 may be configured to transmit a signal to the planting probe 1010 to suspend harvesting operations until the retention crate is emptied.

Although described above in reference to a track-based planting and harvesting probe configuration, various embodiments may be configured to plant seeds and/or harvest produce via an unmanned aerial vehicle (UAV) comprising a planting probe and/or a harvesting probe having a configuration similar to that described above. The UAV may be autonomous, and may be configured to navigate the interior of the growth habitat according to a defined planting plan. In certain embodiments, the planting plan may define a map of locations of intended seed plantings, such that the autonomous UAV may be configured to autonomously navigate between the plurality of intended seed planting locations to deposit seeds within the growth medium.

The autonomous UAV may additionally comprise a harvesting probe configuration similar to that described herein. The UAV with the harvesting probe configuration may be configured to autonomously navigate the interior of the growth habitat to harvest produce grown therein.

The irrigation system of the growth habitat may be embodied as one or more tubes that may be connected to water distribution mechanisms, such as spraying-style sprinklers, drip-irrigation tubes, and/or the like. The tubes may comprise a plastic, flexible tubing and may be embodied as a self-healing material configured to self-seal cracks, cuts, and/or punctures through the tube walls. These tubes may be connected to a water outlet of a condensation system of the AWG system, a water holding tank of the AWG system, and/or the like.

Moreover, the irrigation system may comprise a fertilizer supply mechanism configured to automatically mix a metered quantity of fertilizer (e.g., a liquid fertilizer) into water supplied to the irrigation system. The fertilizer supply mechanism may be in electronic communication with the control computing system 1004, which may be configured to provide signals to the fertilizer supply mechanism to modify the amount of liquid fertilizer introduced into the water stream.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

In certain embodiments, various portions of the AWG system may be enclosed within one or more shipping containers that may be easily transported as modular system components to desired operating locations. For example, the air preconditioning system may be enclosed within a first container, and one or more water consolidation systems (e.g., a single-stage batch water consolidation system and/or a continuous water consolidation system) may be enclosed within a second shipping container, with various ports/inlets extending through walls of the shipping containers to enable connection with one or more geothermal cooling systems, solar heating systems, high-pressure gas inputs, and/or the like. In certain embodiments, one or more condensation systems, water storage tanks, and/or the like may be embodied within a third storage container. However, it should be understood that certain embodiments may be configured such that the entirety of the AWG system may be enclosed within a single storage container, with one or more ports/inlets extending through walls thereof to enable interaction with aspects of the surrounding environment (e.g., air inlets/exhausts, high pressure gas inlets, solar heating inlets/outlets, geothermal cooling inlets/outlets, and/or the like).

That which is claimed:

1. A greenhouse comprising:
a growth habitat structure for sustaining controlled atmospheric conditions therein, wherein the growth habitat structure comprises one or more sidewalls comprising a covering material at least partially enclosing the growth habitat structure, wherein the covering material comprises:
   a first flexible protecting layer, wherein the first flexible protecting layer is one of transparent or translucent;
   a second flexible protecting layer;
   a plurality of photovoltaic elements forming a photovoltaic array, wherein the photovoltaic array is positioned between the first flexible protecting layer and the second flexible protecting layer and is configured to collect sunlight through the first flexible protecting layer; and
   a plurality of light emitting diode (LED) elements forming an LED array, wherein the LED array is positioned between the first flexible protecting layer and the second flexible protecting layer and is configured to emit light through at least one of the first flexible protecting layer or the second flexible protecting layer; and
wherein the plurality of LED elements receive electrical power from the plurality of photovoltaic elements;
an irrigation system for providing water to a growth medium within the growth habitat structure; and
an atmospheric water generation system for providing water to the irrigation system, wherein the atmospheric water generation system comprises:
   a water vapor consolidation system comprising:
      an atmospheric air intake mechanism defining an atmospheric air stream between an air intake and an air exhaust;
      a controlled air circulation mechanism defining an air circulation loop, wherein the air circulation loop is separated from the atmospheric air stream; and
      a fluid desiccant circulation loop defining a closed desiccant circulation loop for a fluid desiccant, wherein the closed desiccant circulation loop intersects the atmospheric air stream and the air circulation loop to extract water vapor from the atmospheric air stream and to evaporate water vapor into the air circulation loop; and
a condenser positioned within the air circulation loop and configured to condense water vapor from the air circulation loop into liquid water for provision to the irrigation system.

2. The greenhouse of claim 1, wherein the covering material comprises one or more integrated lamps.

3. The greenhouse of claim 1, wherein the covering material comprises one or more rigid panels.

4. The greenhouse of claim 1, wherein the photovoltaic array is flexible.

5. The greenhouse of claim 1, further comprising one or more electrical connectors extending beyond the covering material, wherein the one or more electrical connectors are configured to be connected relative to additional covering materials.

6. The greenhouse of claim 1, wherein the second flexible protecting layer is one of transparent or translucent.

7. The greenhouse of claim 1, further comprising one or more rigid support members for supporting the covering material, and wherein the covering material further comprises one or more attachment members configured to secure the covering material onto the one or more rigid support members to at least partially enclose the growth habitat structure.

8. The greenhouse of claim 1, wherein the atmospheric water generation system is at least partially enclosed within a portable enclosure connected with the growth habitat structure.

9. The greenhouse of claim 1, wherein the fluid desiccant circulation loop comprises at least one desiccant column configured to contact the fluid desiccant with the atmospheric air stream and the air circulation loop, and wherein the desiccant column is configurable between:
   an absorption configuration in which the atmospheric air stream flows through the desiccant column to contact the fluid desiccant such that the fluid desiccant absorbs water vapor from the atmospheric air stream; and
an evaporation configuration in which the air circulation loop flows through the desiccant column to contact the fluid desiccant such that water evaporates from the fluid desiccant into the air circulation loop.

10. A greenhouse comprising:
a growth habitat structure for sustaining controlled atmospheric conditions therein, wherein the growth habitat structure comprises one or more sidewalls comprising a covering material at least partially enclosing the growth habitat structure;
an irrigation system for providing water to a growth medium within the growth habitat structure; and
an atmospheric water generation system for providing water to the irrigation system, wherein the atmospheric water generation system comprises:
   a water vapor consolidation system comprising:
      an atmospheric air intake mechanism defining an atmospheric air stream between an air intake and an air exhaust;
      a controlled air circulation mechanism defining an air circulation loop, wherein the air circulation loop is separated from the atmospheric air stream; and
      a fluid desiccant circulation loop defining a closed desiccant circulation loop for a fluid desiccant, wherein the closed desiccant circulation loop intersects the atmospheric air stream and the air circulation loop to extract water vapor from the atmospheric air stream and to evaporate water vapor into the air circulation loop, wherein the fluid desiccant circulation loop comprises;

at least one desiccant column configured to contact the fluid desiccant with the atmospheric air stream and the air circulation loop;

a desiccant cooling mechanism configured to cool the fluid desiccant prior to contacting the fluid desiccant with the atmospheric air stream; and a desiccant heating mechanism configured to heat the fluid desiccant prior to contacting the fluid desiccant with the air circulation loop, wherein the desiccant heating mechanism comprises a solar heating mechanism.

11. The greenhouse of claim 10, wherein the fluid desiccant circulation loop comprises:

an absorption desiccant column configured to contact the fluid desiccant with the atmospheric air stream; and an evaporation desiccant column configured to contact the fluid desiccant with the air circulation loop.

12. A greenhouse comprising:

a growth habitat structure for sustaining controlled atmospheric conditions therein, wherein the growth habitat structure comprises one or more sidewalls comprising a covering material at least partially enclosing the growth habitat structure;

an irrigation system for providing water to a growth medium within the growth habitat structure; and an atmospheric water generation system for providing water to the irrigation system, wherein the atmospheric water generation system comprises:

a water vapor consolidation system comprising:

an atmospheric air intake mechanism defining an atmospheric air stream between an air intake and an air exhaust;

a controlled air circulation mechanism defining an air circulation loop, wherein the air circulation loop is separated from the atmospheric air stream; and a fluid desiccant circulation loop defining a closed desiccant circulation loop for a fluid desiccant, wherein the closed desiccant circulation loop intersects the atmospheric air stream and the air circulation loop to extract water vapor from the atmospheric air stream and to evaporate water vapor into the air circulation loop;

a membrane desorption system, wherein the membrane desorption system comprises a porous membrane separating the fluid desiccant circulation loop on a first side of the porous membrane from a liquid water circulation loop on a second side of the porous membrane, and wherein the membrane desorption system is configured to migrate water from the fluid desiccant circulation loop through the porous membrane to the liquid water circulation loop; and a condenser positioned within the air circulation loop and configured to condense water vapor from the air circulation loop into liquid water for provision to the irrigation system.

13. The greenhouse of claim 12, wherein the growth habitat structure comprises a plurality of lobes collectively defining a star shape.

14. The greenhouse of claim 12, further comprising:

a control computing system configured to regulate environmental conditions within the growth habitat structure; and one or more sensors positioned within the growth habitat structure to monitor the environmental conditions within the growth habitat structure, wherein the one or more sensors are in communication with the control computing system.

15. The greenhouse of claim 14, wherein the one or more sensors are selected from: moisture sensors, temperature sensors, carbon dioxide content sensors, oxygen sensors, or humidity sensors.

16. The greenhouse of claim 12, wherein the atmospheric water generation system additionally comprises a carbon dioxide capture system configured to remove carbon dioxide gas from the atmospheric air stream.

17. The greenhouse of claim 16, wherein the atmospheric water generation system further comprises a carbon dioxide flow stream for selectively providing the carbon dioxide gas into the growth habitat structure.

18. The greenhouse of claim 12, wherein the growth medium is soil.

* * * * *

UNITED STATES PATENT AND TRADEMARK OFFICE
CERTIFICATE OF CORRECTION

| | |
|---|---|
| PATENT NO. | : 11,623,177 B2 |
| APPLICATION NO. | : 17/301680 |
| DATED | : April 11, 2023 |
| INVENTOR(S) | : Stuckenberg |

Page 1 of 1

It is certified that error appears in the above-identified patent and that said Letters Patent is hereby corrected as shown below:

In the Claims

Column 30,
Line 67, "comprises;" should read --comprises:--.

Signed and Sealed this
Seventh Day of November, 2023

Katherine Kelly Vidal
*Director of the United States Patent and Trademark Office*